(12) United States Patent
Irie et al.

(10) Patent No.: US 10,848,692 B2
(45) Date of Patent: Nov. 24, 2020

(54) GLOBAL SHUTTER AND ROLLING SHUTTER DRIVE START TIMINGS FOR IMAGING APPARATUS, IMAGING METHOD, AND IMAGING PROGRAM

(71) Applicant: FUJIFILM Corporation, Tokyo (JP)

(72) Inventors: Fuminori Irie, Saitama (JP); Tomonori Masuda, Saitama (JP); Hidekazu Kurahashi, Saitama (JP); Yoshinori Furuta, Saitama (JP); Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/585,933

(22) Filed: Sep. 27, 2019

(65) Prior Publication Data

US 2020/0029034 A1 Jan. 23, 2020

Related U.S. Application Data

(63) Continuation of application No. PCT/JP2018/008399, filed on Mar. 5, 2018.

(30) Foreign Application Priority Data

Mar. 28, 2017 (JP) .................................. 2017-063231

(51) Int. Cl.
*H04N 5/335* (2011.01)
*H04N 5/353* (2011.01)
(Continued)

(52) U.S. Cl.
CPC ........... *H04N 5/3532* (2013.01); *G03B 7/093* (2013.01); *H04N 5/2353* (2013.01)

(58) Field of Classification Search
CPC .............................. H04N 5/3532; G03B 7/093
See application file for complete search history.

(56) References Cited

U.S. PATENT DOCUMENTS

| 8,994,861 B2* | 3/2015 | Kobayashi | H04N 5/335 348/294 |
| 10,623,673 B2* | 4/2020 | Kawai | H04N 5/378 |
| 2012/0182455 A1* | 7/2012 | Gomi | H04N 5/3532 348/311 |

FOREIGN PATENT DOCUMENTS

| JP | 2012-4819 A | 1/2012 |
| JP | 2012-10074 A | 1/2012 |
| JP | 2012-129817 A | 7/2012 |

OTHER PUBLICATIONS

International Preliminary Report on Patentability and English translation of the Written Opinion of the International Searching Authority (Forms PCT/IB/326, PCT/IB/373, and PCT/ISA/237) for International Application No. PCT/JP2018/008399, dated Oct. 10, 2019.

(Continued)

*Primary Examiner* — Gary C Vieaux
(74) *Attorney, Agent, or Firm* — Birch, Stewart, Kolasch & Birch, LLP

(57) ABSTRACT

An imaging apparatus includes an imager, an imaging controller and a display controller as defined herein, a time required for the first rolling readout drive is longer than a time required for each of the rolling reset drive, the rolling shutter drive and the second rolling readout drive, and in an imaging mode in which the imaging controller performs the first drive while continuously performing the second drive, the imaging controller sets a first start timing of the second drive performed first after a start of the first drive to be during an implementation period of the first rolling readout drive in the first drive, and synchronizes a second start timing of the rolling shutter drive performed first after the start of the first drive with the display update timing that comes first after an end of the first rolling readout drive.

25 Claims, 21 Drawing Sheets

(51) Int. Cl.
*G03B 7/093* (2006.01)
*H04N 5/235* (2006.01)

(56) References Cited

OTHER PUBLICATIONS

International Search Report (Form PCT/ISA/210) for International Application No. PCT/JP2018/008399, dated May 15, 2018, with English translation.

* cited by examiner

GLOBAL SHUTTER AND ROLLING SHUTTER DRIVE START TIMINGS FOR IMAGING APPARATUS, IMAGING METHOD, AND IMAGING PROGRAM

CROSS REFERENCE TO RELATED APPLICATION

This is a continuation of International Application No. PCT/JP2018/008399 filed on Mar. 5, 2018, and claims priority from Japanese Patent Application No. 2017-063231 filed on Mar. 28, 2017, the entire disclosures of which are incorporated herein by reference.

BACKGROUND OF THE INVENTION

1. Field of the Invention

The present invention relates to an imaging apparatus, an imaging method, and a computer readable medium storing an imaging program.

2. Description of the Related Art

In recent years, with an increase in resolution of imagers such as charge coupled device (CCD) image sensors or complementary metal oxide semiconductor (CMOS) image sensors, there has been a rapid increase in the demand for electronic devices having imaging functions of electronic endoscopes, digital still cameras, digital video cameras, mobile phones with cameras, or the like. Note that an electronic device having an imaging function as described above is referred to as an imaging apparatus.

Examples of a MOS type imager includes one which includes a photoelectric conversion element, a charge holder that holds a charge generated and accumulated in the photoelectric conversion element, and a readout circuit that reads out, to a signal line, a pixel signal corresponding to the charge held in the charge holder, and in which pixels are two-dimensionally disposed.

Such an imager can perform a global shutter type drive and rolling shutter type drive.

In the global shutter drive type, the photoelectric conversion elements of all the pixels are simultaneously reset to start exposure simultaneously in all the pixels, then charges accumulated in the photoelectric conversion elements of each pixel are transferred to the charge holder of each pixel to simultaneously end the exposure in all the pixels, and then the charges accumulated in the charge holder are sequentially converted to pixel signals for each pixel row and are read out to a signal line.

In the rolling shutter type drive, the photoelectric conversion elements of the pixel row are reset to start the exposure of the pixel row, and then the charges accumulated in the photoelectric conversion elements of the pixel row are transferred to the charge holder to end the exposure and to sequentially perform a drive for reading out, to the signal line, the pixel signal corresponding to the charge held in the charge holder, while changing the pixel rows.

JP2012-129817A discloses an imaging apparatus which drives the imager by a global shutter type at the time of imaging for a still image storage, and drives the imager by the rolling shutter type at the time of imaging for a live view image display.

JP2012-129817A discloses a start of the imaging for the live view image display during a readout period of the pixel signal from the charge holder at the time of the imaging for the still image storage.

SUMMARY OF THE INVENTION

In an imaging apparatus that displays a live view image, the live view image is updated at a regular interval. Therefore, for synchronizing an end timing of imaging for a live view image display and an update timing of the live view image display, a drive condition of the imager is determined.

On the other hand, the number of the pixel signals read out from the charge holder is larger in imaging for a still image storage than in the imaging for the live view image display.

Therefore, a time required for reading out the pixel signal from the charge holder becomes longer in the imaging for the still image storage than in the imaging for the live view image display.

Due to a difference in the readout time, normally, the imaging for the live view image display is resumed after the imaging for the still image storage ends (the readout of the pixel signals from all the charge holders is completed).

However, in a method of resuming the imaging for the live view image display after the imaging for the still image storage ends, the time when the live view image cannot be updated may become long. In this case, for a user who picks up an image while looking at a display device, a possibility of losing a subject becomes high.

In an imaging apparatus disclosed in JP2012-129817A, the readout time of the pixel signal from the charge holder is the same for the global shutter type drive and the drive of the rolling shutter drive type, and a drive of a case that the readout time of the pixel signal in the global shutter type drive becomes relatively long is not disclosed.

The present invention has been made in view of the above described situations, and an object of the present invention is to provide an imaging apparatus, an imaging method, and a computer readable medium storing an imaging program capable of speeding up an update of a live view image display, after a still image pick up is performed, to reduce a risk of losing sight of the subject.

An imaging apparatus of the present invention is an imaging apparatus comprising:

an imager
  that has a plurality of pixels each including a photoelectric conversion element, a charge holder holding a charge transferred from the photoelectric conversion element such that a signal corresponding to the charge is read out by a readout circuit, and a charge discharge region to which the charge of the photoelectric conversion element is discharged without passing through the charge holder,
  that comprises a plurality of pixel rows including the plurality of pixels arranged in one direction, and
  that images a subject through an imaging optical system;
an imaging controller that performs a first drive and a second drive,
the first drive being of a global shutter type and including
  a global reset drive of simultaneously resetting the photoelectric conversion element of each of the plurality of pixels to start exposure of the plurality of pixels,
  a global shutter drive of simultaneously transferring, to the charge holder, charges accumulated in the photoelectric conversion element of each of the plurality of pixels by the exposure to end the exposure, and a first rolling readout drive of sequentially reading out, for each of the pixel rows, the signal corresponding to the charge held in the charge holder by the global shutter drive, the second drive being of a rolling shutter type and including a rolling reset drive of sequentially performing processing of discharging the charge of the photoelectric conversion element of the pixel row to the charge discharge region to start the exposure of the photoelectric conversion element, while changing the pixel rows, a rolling shutter drive of sequentially performing processing of transferring, to the charge holder, the charge accumulated in the photoelectric conversion element of the pixel row for which the exposure has been started by the rolling reset drive to end the exposure of the pixel row, while changing the pixel rows, and a second rolling readout drive of sequentially reading out the signal corresponding to the charge held in the charge holder of the pixel row by the rolling shutter drive, while changing the pixel rows; and a display controller that displays, on a display device, a live view image generated based on the signal output from the pixel of the imager by the second drive, wherein a time required for the first rolling readout drive is longer than a time required for each of the rolling reset drive, the rolling shutter drive, and the second rolling readout drive, and wherein, in an imaging mode in which the imaging controller performs the first drive while continuously performing the second drive, the imaging controller sets a first start timing of the second drive performed first after a start of the first drive to be during an implementation period of the first rolling readout drive in the first drive, and synchronizes a second start timing of the rolling shutter drive performed first after the start of the first drive with a display update timing of the display device that comes first after an end of the first rolling readout drive.

An imaging method of the present invention is an imaging method using an imager that has a plurality of pixels each including a photoelectric conversion element, a charge holder holding a charge transferred from the photoelectric conversion element such that a signal corresponding to the charge is read out by a readout circuit, and a charge discharge region to which the charge of the photoelectric conversion element is discharged without passing through the charge holder, that comprises a plurality of pixel rows including the plurality of pixels arranged in one direction, and that images a subject through an imaging optical system, the imaging method comprising:

an imaging control step of performing a first drive and a second drive, the first drive being of a global shutter type and including a global reset drive of simultaneously resetting the photoelectric conversion element of each of the plurality of pixels to start exposure of the plurality of pixels, a global shutter drive of simultaneously transferring, to the charge holder, charges accumulated in the photoelectric conversion element of each of the plurality of pixels by the exposure to end the exposure, and a first rolling readout drive of sequentially reading out, for each of the pixel rows, the signal corresponding to the charge held in the charge holder by the global shutter drive, the second drive being of a rolling shutter type and including a rolling reset drive of sequentially performing processing of discharging the charge of the photoelectric conversion element of the pixel row to the charge discharge region to start the exposure of the photoelectric conversion element, while changing the pixel rows, a rolling shutter drive of sequentially performing processing of transferring, to the charge holder, the charge accumulated in the photoelectric conversion element of the pixel row for which the exposure has been started by the rolling reset drive to end the exposure of the pixel row, while changing the pixel rows, and a second rolling readout drive of sequentially reading out the signal corresponding to the charge held in the charge holder of the pixel row by the rolling shutter drive, while changing the pixel rows; and a display control step of displaying, on a display device, a live view image generated based on the signal output from the pixel of the imager by the second drive, wherein, in a time required for the first rolling readout drive is longer than a time required for each of the rolling reset drive, the rolling shutter drive, and the second rolling readout drive, and wherein in the imaging control step, in an imaging mode in which the first drive is performed while the second drive is continuously performed, a first start timing of the second drive performed first after a start of the first drive is set to be during an implementation period of the first rolling readout drive in the first drive, and a second start timing of the rolling shutter drive performed first after the start of the first drive is synchronized with a display update timing of the display device that comes first after an end of the first rolling readout drive.

An imaging program of the present invention is an imaging program causing a computer to execute an imaging method using an imager that has a plurality of pixels each including a photoelectric conversion element, a charge holder holding a charge transferred from the photoelectric conversion element such that a signal corresponding to the charge is read out by a readout circuit, and a charge discharge region to which the charge of the photoelectric conversion element is discharged without passing through the charge holder, that comprises a plurality of pixel rows including the plurality of pixels arranged in one direction, and that images a subject through an imaging optical system, the imaging method comprising:

an imaging control step of performing a first drive and a second drive, the first drive being of a global shutter type and including a global reset drive of simultaneously resetting the photoelectric conversion element of each of the plurality of pixels to start exposure of the plurality of pixels, a global shutter drive of simultaneously transferring, to the charge holder, charges accumulated in the photoelectric conversion element of each of the plurality of pixels by the exposure to end the exposure, and a first rolling readout drive of sequentially reading out, for each of the pixel rows, the signal corresponding to the charge held in the charge holder by the global shutter drive, the second drive being of a rolling shutter type and including a rolling reset drive of sequentially performing processing of discharging the charge of the photoelectric conversion element of the pixel row to the charge discharge region to start the exposure of the photoelectric conversion element, while changing the pixel rows, a rolling shutter drive of sequentially performing processing of transferring, to the charge holder, the charge accumulated in the photoelectric conversion element of the pixel row for which the exposure has been started by the rolling reset drive to end the exposure of the pixel row, while changing the pixel rows, and a second rolling readout drive of sequentially reading out the signal corresponding to the charge held in the charge holder of the pixel row by the rolling shutter drive, while changing the pixel rows; and a display control step of displaying, on a display device, a live view image generated based on the signal output from the pixel of the imager by the second drive, wherein a time required for the first rolling readout drive is longer than a time required for each of the rolling reset drive, the rolling shutter drive, and the second rolling readout drive, and wherein in the imaging control step, in an imaging mode in which the first drive is performed while the second drive is continuously performed, a first start timing of the second drive performed first after a start of the first drive is set to be during an implementation period of the first rolling readout drive in the first drive, and a second start timing of the rolling shutter drive performed first after the start of the first drive is synchronized with a display update timing of the display device that comes first after an end of the first rolling readout drive.

According to the present invention, it is possible to provide an imaging apparatus, an imaging method, and an imaging program capable of speeding up an update of a live view image display, after a still image pick up is performed, to reduce a risk of losing sight of the subject.

DESCRIPTION OF THE PREFERRED EMBODIMENTS

Hereinafter, embodiments of the present invention will be described with reference to the drawings.

Figure 1:
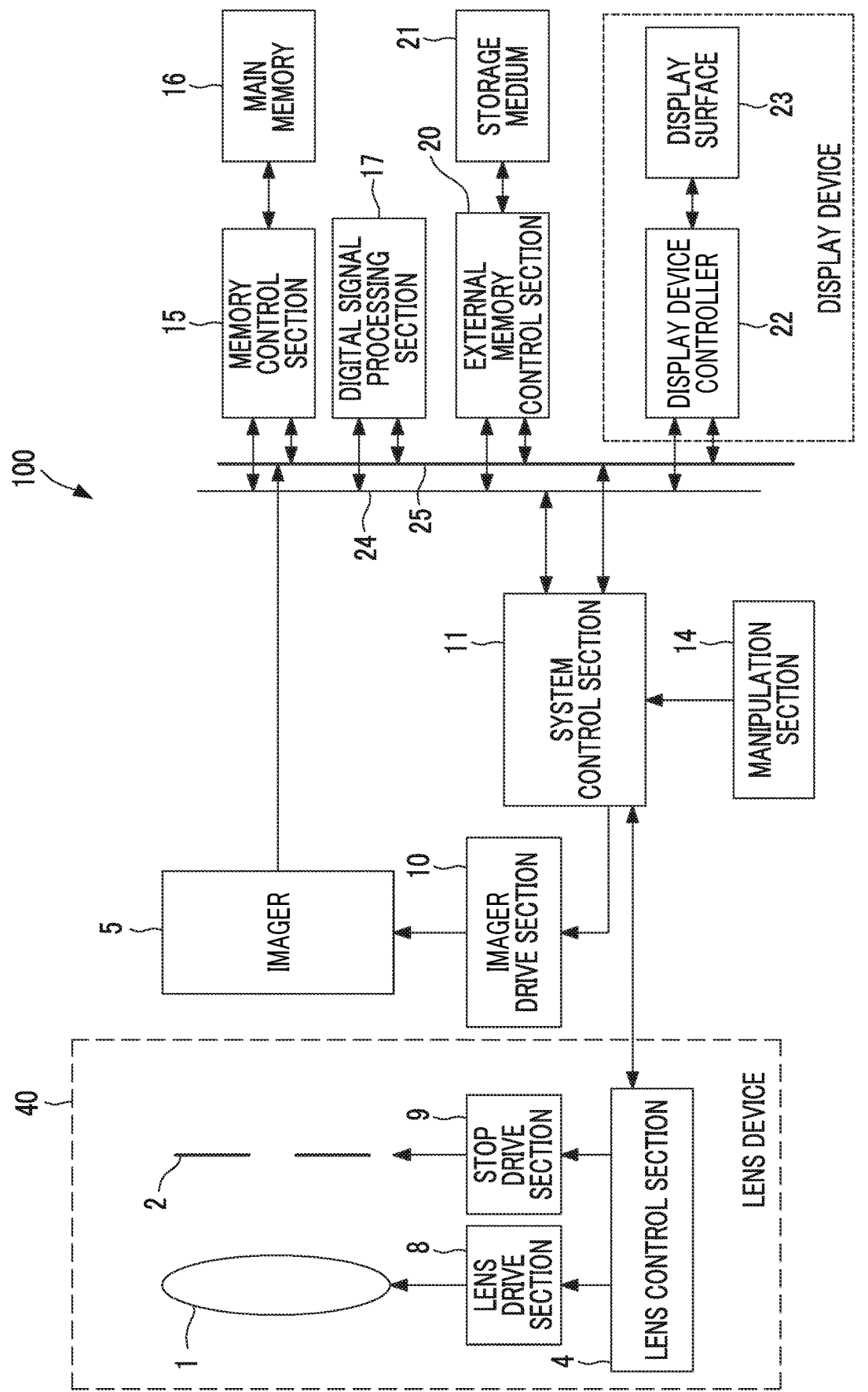
FIG. 1 is a diagram showing a schematic configuration of a digital camera 100 which is an embodiment of an imaging apparatus of the present invention.

FIG. 1 is a diagram showing a schematic configuration of a digital camera 100 which is an embodiment of an imaging apparatus of the present invention.

The digital camera 100 shown in FIG. 1 comprises a lens device 40 having an imaging lens 1, a stop 2, a lens control section 4, a lens drive section 8, and a stop drive section 9.

The lens device 40 may be attachable to and detachable from the digital camera 100 or may be integrated with the digital camera 100.

The imaging lens 1 and the stop 2 constitute an imaging optical system, and the imaging lens 1 includes a focus lens or a zoom lens movable in an optical axis direction, or the like.

The focus lens is a lens for adjusting a focus of the imaging optical system, and is composed of a single lens or a plurality of lenses. As the focus lens moves in the optical axis direction, a position of a principal point of the focus lens changes along the optical axis direction, and a focal position on a subject side changes.

As the focus lens, a liquid lens, capable of a focus adjustment by changing the position of the principal point in the optical axis direction by an electric control, may be used.

The lens control section 4 of the lens device 40 is configured to be capable of communicating with a system control section 11 of the digital camera 100 by wire or wireless.

The lens control section 4 controls the focus lens included in the imaging lens 1 via the lens drive section 8 in accordance with a command from the system control section 11 to change the position of the principal point of the focus lens (changes a focal length), or controls an aperture size of the stop 2 via the stop drive section 9. In the present specification, an F-Number of the stop 2 is a value indicating the aperture size of the stop 2, and the greater the F-Number, the smaller the aperture size.

The digital camera 100 further comprises a MOS type imager 5 that images the subject through the imaging optical system.

The imager 5 has an imaging surface in which a plurality of pixels is two-dimensionally disposed, and converts a subject image, formed on the imaging surface by the imaging optical system, to a pixel signal by the plurality of pixels and outputs the signal. Hereinafter, a set of pixel signals output from each pixel of the imager 5 is referred to as a picked up image signal.

The system control section 11, which collectively controls an entire electric control system of the digital camera 100, drives the imager 5 via an imager drive section 10, and output the subject image picked up through the imaging optical system of the lens device 40 as the picked up image signal.

A command signal from a user is input to the system control section 11 through a manipulation section 14.

The system control section 11 collectively controls the entire digital camera 100, and has a hardware structure that refers to various types of processors that execute programs including an imaging program to perform processing.

Various types of processors include a programmable logic device (PLD) that is a processor capable of changing a circuit configuration after manufacturing of a central processing unit (CPU), a field programmable gate array (FPGA), or the like as a general-purpose processor that performs various types of processing by executing programs, a dedicated electric circuit that is a processor having a circuit configuration designed exclusively for executing specific processing of an application specific integrated circuit (ASIC) or the like, and the like.

More specifically, a structure of the various types of processors is an electric circuit in which circuit elements such as semiconductor elements are combined.

The system control section 11 may be configured as one of various processors, or may be configured as a combination of two or more of the same or different types of processors (for example, a combination of a plurality of FPGAs or a combination of the CPU and the FPGA).

Further, the electric control system of the digital camera 100 comprises a main memory 16 including a random access memory (RAM), a memory control section 15 that controls a data storage in the main memory 16 and a data readout from the main memory 16, a digital signal processing section 17 that performs digital signal processing on the picked up image signal output from the imager 5 and generates picked up image data in accordance with various types of formats such as a JPEG (Joint Photographic Experts Group) format, an external memory control section 20 that controls a data storage in a storage medium 21 and a data readout from the storage medium 21, a display surface 23 including an organic electroluminescence (EL) panel, a liquid crystal panel, or the like, and a display device controller 22 that controls a display of the display surface 23. The display surface 23 and the display device controller 22 constitute a display device.

The storage medium 21 is a semiconductor memory such as a flash memory built in the digital camera 100 or a portable semiconductor memory attachable to and detachable from the digital camera 100.

The memory control section 15, the digital signal processing section 17, the external memory control section 20, and the display device controller 22 are mutually connected by a control bus 24 and a data bus 25, and are controlled by the command from the system control section 11.

The digital signal processing section 17 has a hardware structure referring to the above exemplified various types of processors that execute the program and perform the processing.

The display device controller 22 includes the above exemplified various types of processors that execute the program to perform the processing, and a display memory for holding the image data to be displayed.

Figure 2:
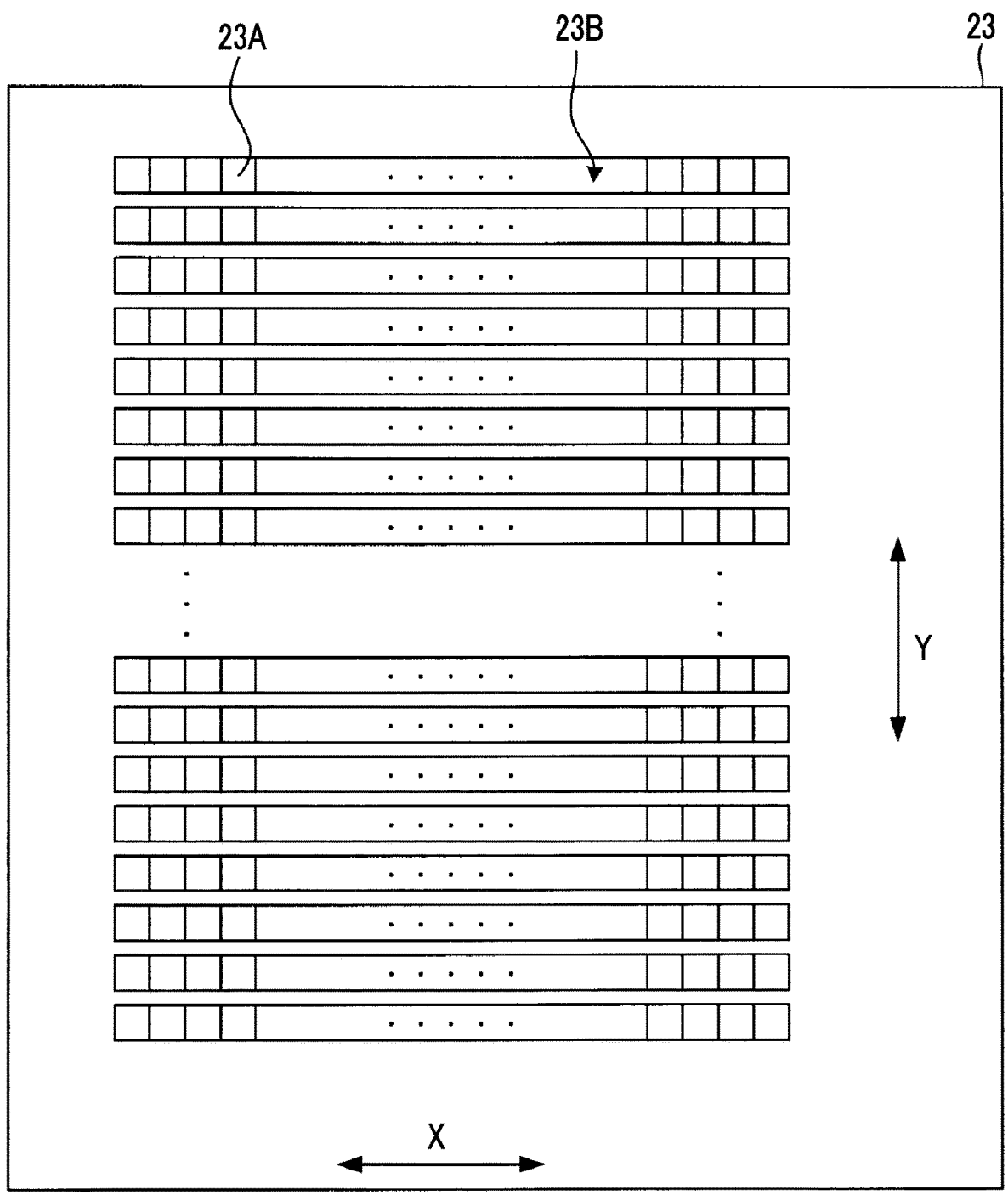
FIG. 2 is a schematic plan view showing a schematic configuration of a display surface 23 shown in FIG. 1.

FIG. 2 is a schematic plan view showing a schematic configuration of the display surface 23 shown in FIG. 1.

The display surface 23 is a surface in which a plurality of display pixel rows 23B including a plurality of display pixels 23A aligned in a row direction X that is one direction are arranged in a column direction Y that is an orthogonal direction orthogonal to the row direction X.

The display device controller 22 performs drawing update processing of sequentially updating a line image to be drawn on a display pixel row 23B, from the display pixel row 23B at an upper end (one end) of the display surface 23 in the column direction Y toward the display pixel row 23B at a lower end (the other end), so that a live view image including the same number of line images as the display pixel row 23B is displayed on the display surface 23.

Figure 3:
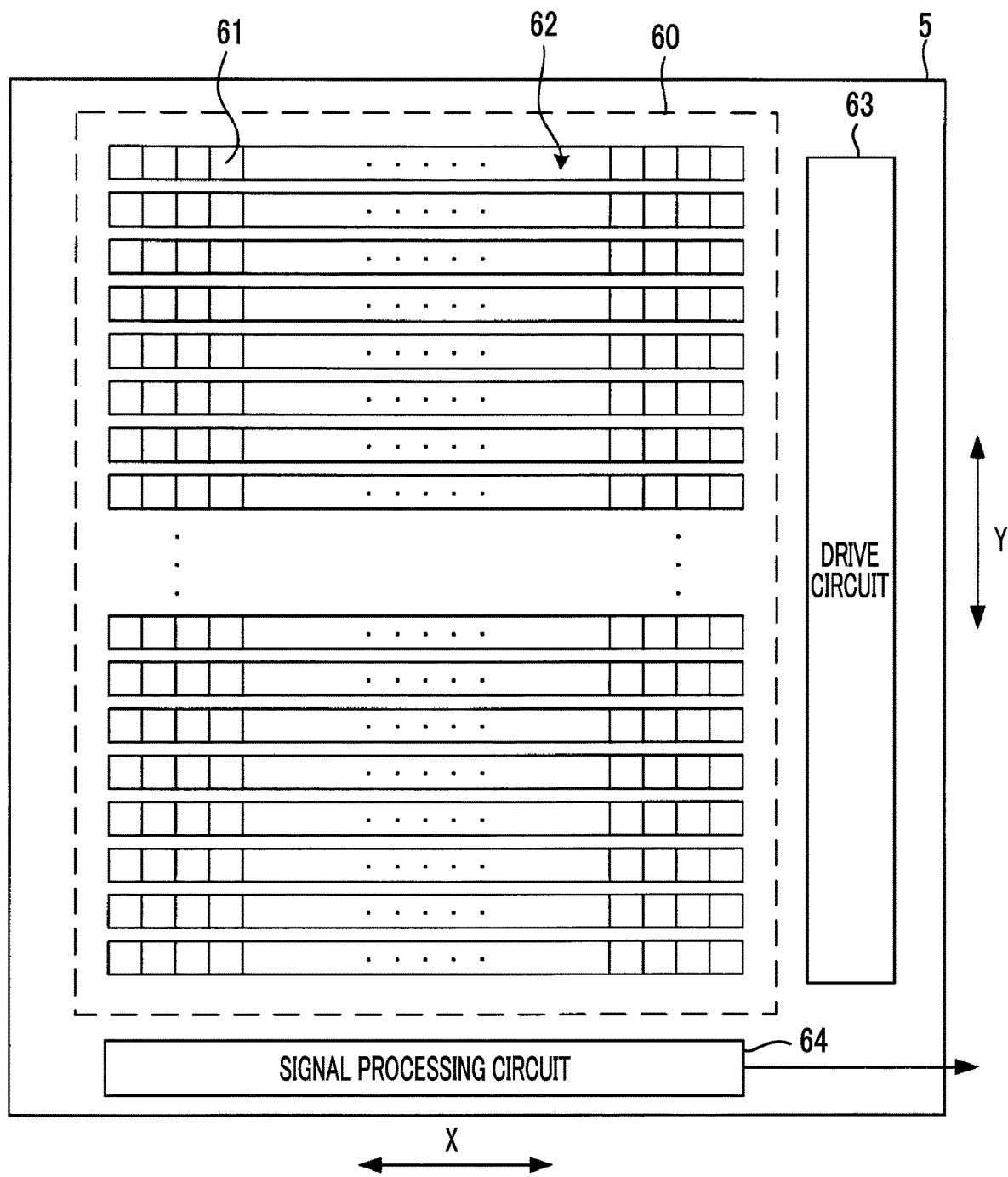
FIG. 3 is a schematic plan view showing a schematic configuration of an imager 5 shown in FIG. 1.
Figure 4:
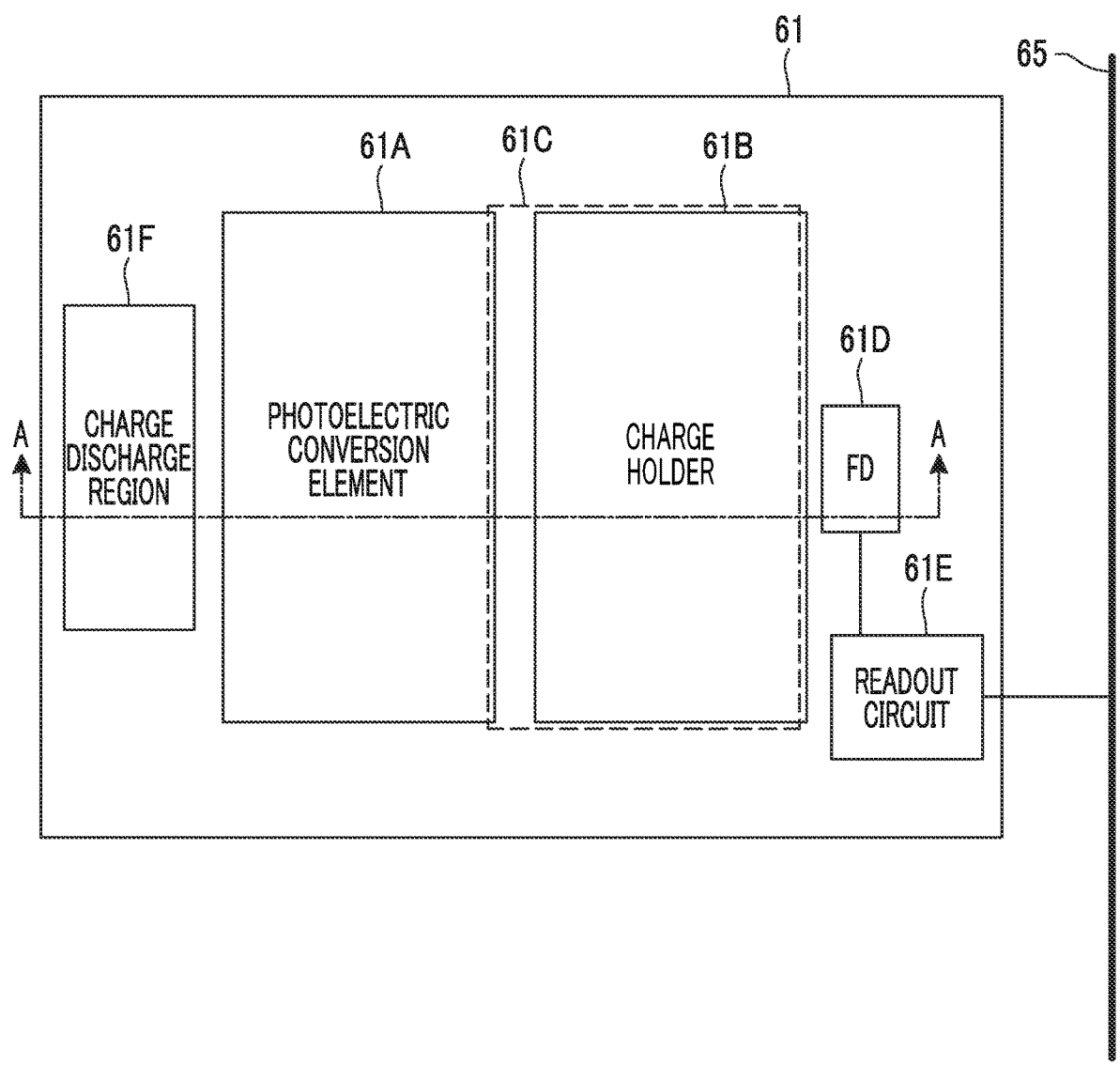
FIG. 4 is a schematic plan view showing a schematic configuration of a pixel 61 of the imager 5 shown in FIG. 3.
Figure 5:
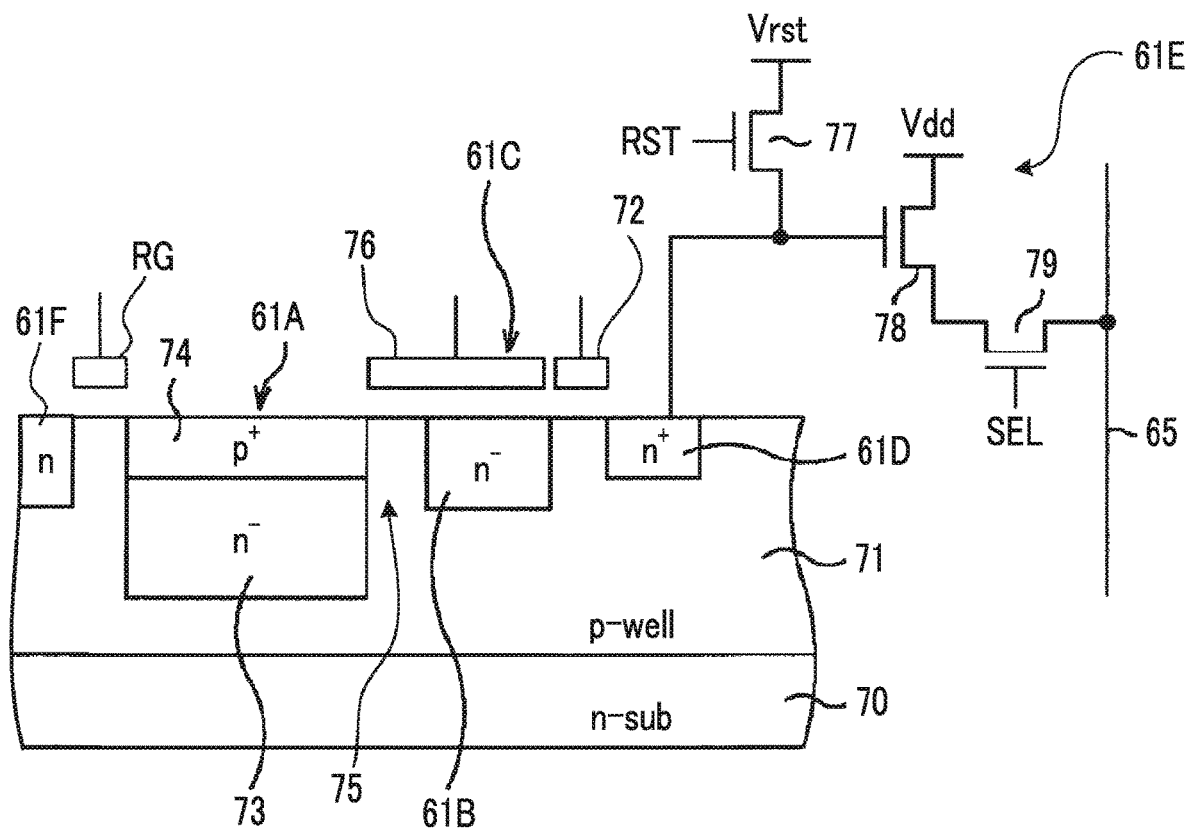
FIG. 5 is a schematic cross-sectional view taken along the line A-A of the pixel 61 of the imager 5 shown in FIG. 4.

FIG. 3 is a schematic plan view showing a schematic configuration of the imager 5 shown in FIG. 1. FIG. 4 is a schematic plan view showing a schematic configuration of a pixel 61 of the imager 5 shown in FIG. 3. FIG. 5 is a schematic cross-sectional view taken along the line A-A of the pixel 61 of the imager 5 shown in FIG. 4.

The imager 5 comprises an imaging surface 60 on which a plurality of pixel rows 62 including a plurality of pixels 61 arranged in the row direction X are arranged in the column direction Y orthogonal to the row direction X, a drive circuit 63 that drives the pixel 61 arranged on the imaging surface 60, and a signal processing circuit 64 that processes the pixel signal which are read out, to the signal line, from the each pixel 61 of the pixel row 62 arranged on the imaging surface 60.

Hereinafter, an end portion on an upper side of the imaging surface 60 in the column direction Y in FIG. 3 is referred to as the upper end, and a lower portion of a lower side of the imaging surface 60 in the column direction Y is referred to as the lower end. The upper end constitutes one end of the imaging surface 60, and the lower end constitutes the other end of the imaging surface 60.

As shown in FIG. 4, the pixel 61 comprises a photoelectric conversion element 61A, a charge holder 61B, a charge transfer section 61C, a floating diffusion 61D, a readout circuit 61E, and a charge discharge region 61F formed on a semiconductor substrate.

The photoelectric conversion element 61A receives light passing through the imaging optical system of the lens device 40, and generates charges corresponding to an amount of received light and accumulates the charges. The photoelectric conversion element 61A includes a photodiode or the like.

The charge transfer section 61C transfers the charge accumulated in the photoelectric conversion element 61A to the charge holder 61B. The charge transfer section 61C includes an impurity region in the semiconductor substrate and an electrode formed above the impurity region.

A voltage applied to the electrode constituting the charge transfer section 61C is controlled by the drive circuit 63, and thus the charge is transferred from the photoelectric conversion element 61A to the charge holder 61B.

The charge holder 61B holds the charge transferred from the photoelectric conversion element 61A by the charge transfer section 61C. The charge holder 61B includes the impurity region in the semiconductor substrate.

The floating diffusion 61D is for converting the charge to a signal, and the charge held by the charge holder 61B is transferred.

The readout circuit 61E is a circuit that reads out, to a signal line 65, the signal corresponding to a potential of the floating diffusion 61D as the pixel signal. The readout circuit 61E is driven by the drive circuit 63.

The charge discharge region 61F is provided to discharge the charge accumulated in the photoelectric conversion element 61A from the photoelectric conversion element 61A.

As shown in FIG. 5, a P-well layer 71 is formed on a surface of an N-type substrate 70, and the photoelectric conversion element 61A is formed on a surface section of the P-well layer 71.

The photoelectric conversion element 61A includes an N-type impurity layer 73 and a P-type impurity layer 74 formed on the N-type impurity layer 73. The N-type substrate 70 and the P-well layer 71 constitute the semiconductor substrate.

On the surface section of the P-well layer 71, a charge holder 61B including an N-type impurity layer is formed to be slightly spaced from the photoelectric conversion element 61A to the right.

A transfer electrode 76 is formed above a region 75 of the P-well layer 71 between the charge holder 61B and the photoelectric conversion element 61A via an oxide film (not shown).

The region 75 and the transfer electrode 76 constitute the charge transfer section 61C. In the example of FIG. 5, the transfer electrode 76 is formed above up to the charge holder 61B, but the transfer electrode 76 which is formed above at least the region 75 may be used.

By controlling the potential of the transfer electrode 76 and forming a channel in the region 75, the charge accumulated in the photoelectric conversion element 61A can be transferred to the charge holder 61B. The potential of the transfer electrode 76 is controlled by the drive circuit 63.

On the surface section of the P-well layer 71, the charge discharge region 61F including the N-type impurity layer is formed to be slightly spaced from the photoelectric conversion element 61A to the left.

An electrode for reset RG is formed above the P-well layer 71 between the charge discharge region 61F and the photoelectric conversion element 61A via the oxide film (not shown).

By controlling the potential of the electrode for reset RG and forming a channel below the electrode for reset RG, the charge accumulated in the photoelectric conversion element 61A can be discharged to the charge discharge region 61F to reset the photoelectric conversion element 61A. The potential of the electrode for reset RG is controlled by the drive circuit 63.

On the surface section of the P-well layer 71, the floating diffusion 61D including the N-type impurity layer is formed to be slightly spaced from the charge holder 61B to the right.

Above the P-well layer 71 between the charge holder 61B and the floating diffusion 61D, a readout electrode 72 is formed via the oxide film (not shown).

By controlling the potential of the readout electrode 72 to form the channel in the region between the charge holder 61B and the floating diffusion 61D, the charge held by the charge holder 61B can be transferred to the floating diffusion 61D. The potential of the readout electrode 72 is controlled by the drive circuit 63.

In the example shown in FIG. 5, the readout circuit 61E includes a reset transistor 77 for resetting the potential of the floating diffusion 61D, an output transistor 78 that converts the potential of the floating diffusion 61D to the pixel signal and outputs the pixel signal, and a selection transistor 79 for selectively reading out, to the signal line 65, the pixel signal output from the output transistor 78. The configuration of the readout circuit is not limited to the above description, which is an example.

Note that the readout circuit 61E may be shared by the plurality of pixels 61.

The drive circuit 63 shown in FIG. 3 drives the transfer electrode 76, the readout electrode 72, the electrode for reset RG, and the readout circuit 61E of each pixel 61 independently for each pixel row 62 to reset each photoelectric conversion element 61A included in the pixel row 62, and reads out, to the signal line 65, the pixel signal corresponding to the charge accumulated in each photoelectric conversion element 61A, or the like. The drive circuit 63 is controlled by the imager drive section 10.

The signal processing circuit 64 shown in FIG. 3 performs correlative double sampling processing on the pixel signal read out from each pixel 61 of the pixel row 62 to the signal line 65, and converts the pixel signal after the correlative double sampling processing to the digital signal so as to output the pixel signal to the data bus 25. The signal processing circuit 64 is controlled by the imager drive section 10.

The total number M of the pixel rows 62 formed on the imaging surface 60 of the imager 5 is larger than the total number m of display pixel rows 23B formed on the display surface 23.

In the digital camera 100, of M pixel rows 62 formed on the imaging surface 60, m pixel rows 62 aligned at a regular interval toward the column direction Y are set as a display target pixel row. Hereinafter, the pixel row 62 set as the display target pixel row is also referred to as the display target pixel row 62.

An i-th (i is 1 to m) display target pixel row 62 counted from the upper end of the imaging surface 60 is managed in association with the i-th display pixel row 23B counted from the upper end of the display surface 23.

Figure 6:
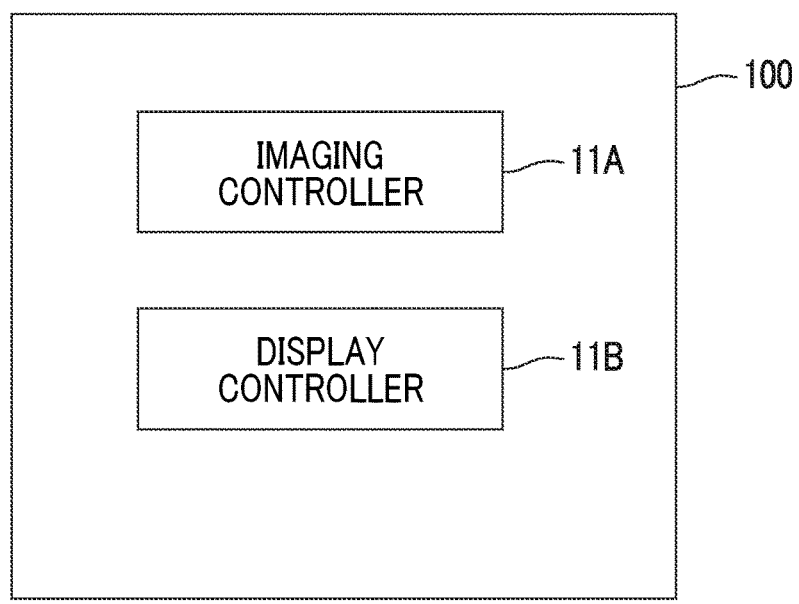
FIG. 6 is a functional block diagram of a digital camera 100 shown in FIG. 1.

FIG. 6 is a functional block diagram of the digital camera 100 shown in FIG. 1.

The digital camera 100 comprises an imaging controller 11A and a display controller 11B as the functional block.

The system control section 11 functions as the imaging controller 11A and the display controller 11B by executing the program including the imaging program.

The imaging controller 11A controls the imager drive section 10 to drive the imager 5 respectively by a global reset drive, a global shutter drive, a rolling reset drive, a rolling shutter drive, a first rolling readout drive, and a second rolling readout drive.

The global reset drive is a drive that simultaneously resets the photoelectric conversion element 61A of each pixel 61 formed on the imaging surface 60 of the imager 5, and simultaneously starts exposure of each pixel 61.

Note that at the time of the global reset drive, the photoelectric conversion element 61A may be reset by resetting the floating diffusion 61D by the reset transistor 77 in a state in which the charge transfer section 61C can transfer the charge and the channel is formed in the semiconductor substrate below the readout electrode 72.

The global shutter drive is a drive that transfers, to the charge holder 61B, the charge accumulated in the photoelectric conversion element 61A of each pixel 61 by the exposure started in each pixel 61 of the M pixel rows 62 by the global reset drive, and simultaneously ends the exposure in all the pixels 61.

The rolling reset drive is a drive that sequentially performs processing of resetting the photoelectric conversion element 61A of the display target pixel row 62 (the charge is discharged from the photoelectric conversion element 61A to the charge discharge region 61F) and of starting exposure of the photoelectric conversion element 61A, while changing the display target pixel rows 62.

The rolling shutter drive is a drive that sequentially performs processing of transferring the charge from the photoelectric conversion element 61A of the exposed display target pixel row 62 to the charge holder 61B of the display target pixel row 62 thereof and of ending the exposure of the display target pixel row 62 thereof, while changing the display target pixel rows 62.

The first rolling readout drive is a drive that sequentially reads out, for each of the M pixel rows 62, pixel signal corresponding to the charge held in the charge holder 61B of each pixel 61 by the global shutter drive.

The second rolling readout drive is a drive that sequentially performs the readout of the pixel signal corresponding to the charge held in the charge holder 61B of the display target pixel row 62 by rolling shutter drive, while changing the display target pixel rows 62.

The first rolling readout drive has more pixel rows 62 to be a drive target than the rolling reset drive, the rolling shutter drive, and the second rolling readout drive.

Therefore, a time required for the first rolling readout drive is longer than a time required for each of the rolling reset drive, the rolling shutter drive, and the second rolling readout drive.

In a case where the digital camera 100 is set to an imaging mode, the imaging controller 11A continuously performs imaging for the live view image display (hereinafter referred to as an LV imaging) by a second drive of the rolling shutter type including the rolling reset drive, the rolling shutter drive, and the second rolling readout drive.

Then, during the continuous execution of the second drive, at a timing of performing an imaging for storing still image data in the storage medium 21 (hereinafter, referred to as a still image pick up), the imaging controller 11A performs the still image pick up by a first drive of the global shutter type including the global reset drive, the global shutter drive, and the first rolling readout drive, and then resumes the imaging for the LV by the second drive.

Note that the timing when the still image pick up is performed is a timing when an imaging instruction is issued by the user, in a single-shot mode in which one piece of the still image data is stored according to one imaging instruction.

In addition, the timing when the still image pick up is performed is a timing that comes at a constant interval determined by a continuous shooting interval after the imaging instruction is issued by the user, in a continuous mode in which a plurality of pieces of still image data is continuously stored according to one imaging instruction.

The digital signal processing section 17 shown in FIG. 1 processes the picked up image signal output from the imager 5 by the first rolling readout drive performed by the imaging controller 11A to generate the picked up image data, and to store the picked up image data in the storage medium 21.

In addition, the digital signal processing section 17 processes a pixel signal group sequentially output from the display target pixel row 62 of the imager 5 by the second rolling readout drive performed by the imaging controller 11A to generate line data corresponding to the display pixel row 23B corresponding to the display target pixel row 62, and to transfer the generated line data to the display device controller 22. A set of the line data constitutes the live view image data.

The display controller 11B shown in FIG. 6 performs control of displaying the live view image, based on the live view image data obtained by the second rolling readout drive, on the display surface 23 via the display device controller 22.

Specifically, the display controller 11B generates a display synchronization signal for instruction to start the drawing update processing by the display device controller 22, and supplies the display synchronization signal to the display device controller 22.

The display device controller 22 starts the drawing update processing in a case the display synchronization signal input from the display controller 11B falls.

That is, in a case where the display synchronization signal falls, the display device controller 22 sequentially selects the display pixel row 23B from the upper end toward the lower end of the display surface 23, and draws the line image, based on the line data corresponding to the selected display pixel row 23B, on the selected display pixel row 23B.

The imaging controller 11A controls the start timing of the second rolling readout drive in the second drive to be a timing synchronized with the falling timing of the display synchronization signal (in other words, the start timing of the drawing update processing by the display device) in the imaging mode.

A second timing synchronized with a first timing refers to a timing prior to the first timing by a predetermined time.

The predetermined time is a time that it takes from the start of the rolling shutter drive until the line data generated first by the digital signal processing section 17 is stored in the display memory of the display device controller 22, and is determined by a processing capacity and a data transmission time of the various types of processors or the like.

The imaging controller 11A controls the start timing of the rolling reset drive in the second drive to be a timing prior to, by a predetermined time, the timing synchronized with the falling timing of the display synchronization signal, so that a proper exposure timing according to a brightness of the subject can be secured.

Note that the imaging controller 11A sets the start timing of the rolling reset drive of the second drive performed first after the start of the first drive to be during the implementation period of the first rolling readout drive in the first drive.

Figure 7:
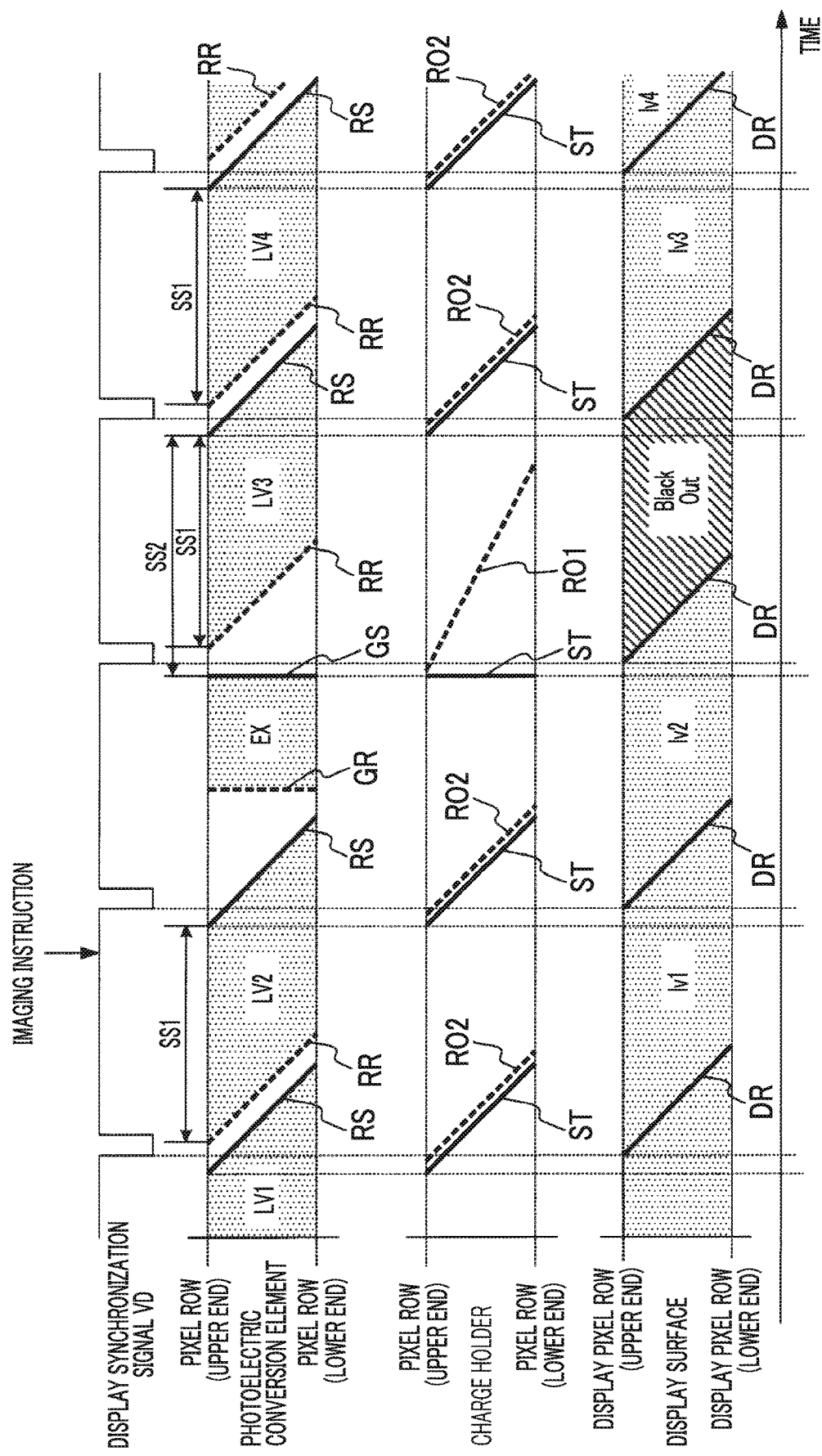
FIG. 7 is a timing chart showing an operation in an imaging mode of the digital camera 100 shown in FIG. 1.

FIG. 7 is a timing chart showing an operation in the imaging mode of the digital camera 100 shown in FIG. 1.

In FIG. 7, a lateral axis represents a time. The display synchronization signal VD supplied from the display controller 11B to the display device controller 22 is shown in an upper part of FIG. 7.

The drive timing of the photoelectric conversion element 61A and the charge holder 61B of each pixel row 62 of the imager 5 is shown in the middle part of FIG. 7. In the middle part of FIG. 7, a vertical axis indicates the position in the column direction Y of the pixel row 62.

A straight line RR shown in the middle part of FIG. 7 indicates the timing when each photoelectric conversion element 61A included in the pixel row 62 is reset by the rolling reset drive.

A straight line RS shown in the middle part of FIG. 7 indicates the timing when the exposure of each photoelectric conversion element 61A included in the pixel row 62 is ended by the rolling shutter drive.

A period surrounded by the straight line RR and the straight line RS right next to the straight line RR indicates an exposure period (LV1, LV2, LV3, LV4) of the imager 5 at the time of the LV imaging.

A straight line GR shown in the middle part of FIG. 7 indicates the timing when each photoelectric conversion element 61A included in the pixel row 62 is reset by the global reset drive.

A straight line GS shown in the middle part of FIG. 7 indicates the timing when the charge is transferred from the photoelectric conversion elements 61A included in the pixel row 62 to the charge holder 61B by the global shutter drive.

A period surrounded by the straight line GR and the straight line GS indicates the exposure period EX of the imager 5 at the time of the still image pick up.

A straight line ST shown in the middle part of FIG. 7 indicates the timing when the charge is held in the charge holder 61B.

A straight line RO1 shown in the middle part of FIG. 7 indicates the timing when the pixel signal corresponding to the charge held in the charge holder 61B is output from the imager 5 by the first rolling readout drive.

A straight line RO2 shown in the middle part of FIG. 7 indicates the timing when the pixel signal corresponding to the charge held by the charge holder 61B is output from the imager 5 by the second rolling readout drive.

The lower part of FIG. 7 shows a drawing state of the display surface 23. In the lower part of FIG. 7, the vertical axis indicates the position of the display pixel row 23B of the display surface 23 in the column direction Y.

A straight line DR shown in the lower part of FIG. 7 indicates the timing when the drawing is performed on the display pixel row 23B of the display surface 23.

Upon the setting of the imaging mode, the imaging controller 11A repeatedly executes the second drive including the rolling reset drive indicated by the straight line RR, the rolling shutter drive indicated by the straight line RS, and the second rolling readout drive indicated by the straight line RO2 at the same interval as a falling cycle of the display synchronization signal VD.

In a case where the pixel signal is output from the display target pixel row 62 by the drive indicated by the straight line RO2 of the second drive, the line data is generated based on the pixel signal, and the line image based on the line data is drawn on the display pixel row 23B corresponding to the display target pixel row 62.

An "lv1" shown in FIG. 7 indicates a period in which the live view image obtained in the exposure period LV1 is displayed.

An "lv2" shown in FIG. 7 indicates a period in which the live view image obtained in the exposure period LV2 is displayed.

In a case where the imaging instruction is issued while the second drive for the LV imaging is performed, the imaging controller 11A ends the second drive during the execution at the time of receiving the imaging instruction, then performs the global reset drive indicated by the straight line GR, and simultaneously performs the reset of the photoelectric conversion elements 61A in all the pixel rows 62. Accordingly, the exposure starts at the same timing in all the pixel rows 62.

Thereafter, in a case where the exposure period EX has elapsed, the imaging controller 11A performs the global shutter drive indicated by the straight line GS.

By the drive, the charges are transferred from the photoelectric conversion element 61A to the charge holder 61B simultaneously in all the pixel rows 62, and the charge holder 61B holds the charge as indicated by the straight line ST. Accordingly, the exposure ends at the same timing in all the pixel rows 62.

After the global shutter drive indicated by the straight line GS is performed, the imaging controller 11A performs the first rolling readout drive indicated by the straight line RO1.

In the first rolling readout drive, the imaging controller 11A selects the M pixel row 62 in order from the upper end toward the lower end of the imaging surface 60, and reads out the pixel signal from the selected pixel row 62.

The picked up image signal output from the imager 5 in the first rolling readout drive is processed by the digital signal processing section 17 to be the picked up image data, and to be stored in the storage medium 21.

The imaging controller 11A starts the rolling reset drive indicated by the straight line RR in a period during which the first rolling readout drive by the straight line RO1 is performed (hereinafter, also referred to as a still image readout period).

By the rolling reset drive, the display target pixel row 62 is selected in order from the upper end toward the lower end of the imaging surface 60, and the charge is discharged from the photoelectric conversion element 61A of the selected display target pixel row 62 to the charge discharge region 61F, so that the exposure of the LV imaging starts.

Then, the imaging controller 11A starts the rolling shutter drive indicated by the straight line RS at a timing synchronized with the falling timing of the display synchronization signal VD that comes first after the end of the first rolling readout drive.

By the rolling shutter drive, the display target pixel row 62 is selected in order from the upper end toward the lower end of the imaging surface 60, the charge is transferred from the photoelectric conversion element 61A of the selected display target pixel row 62 to the charge holder 61B, and the exposure of the display target pixel row 62 (the exposure period LV3 in FIG. 7) is sequentially ended.

The imaging controller 11A starts the rolling shutter drive for ending the exposure period LV3 and, after a short time, starts the second rolling readout drive indicated by the straight line RO2.

By the second rolling readout drive, the display target pixel row 62 is selected in order from an upper end side toward a lower end side in the imaging surface 60, and the pixel signal is read out from the charge holder 61B of the selected display target pixel row 62.

In a case where the pixel signal is output from the display target pixel row 62 by the second rolling readout drive, the line data is generated based on the pixel signal, and the line image based on the line data is drawn on the display pixel row 23B corresponding to the display target pixel row 62.

An "lv3" shown in FIG. 7 indicates a period in which the live view image obtained in the exposure period LV3 is displayed.

Note that the display synchronization signal VD falls immediately after the exposure period EX in the example of FIG. 7, and no new live view image data is generated at this timing.

Therefore, the display device controller 22 sets the line image, drawn on each display pixel row 23B of the display surface 23 at this timing, as a black image. Accordingly, the display surface 23 is in a blackout state between the period 1v2 and the period 1v3.

The display device controller 22 may perform the control of maintaining the line image displayed in the period 1v2 without updating the line image drawn on each display pixel row 23B of the display surface 23 at this timing.

After the end of the exposure period LV3, the LV imaging by the second drive is repeatedly performed until the subsequent imaging timing comes while the imaging condition (the exposure time, the F-Number of the stop 2, and an ISO sensitivity) at the time of the LV imaging immediately after the still image pick up is maintained.

The rolling shutter drive indicated by the straight line RS in FIG. 7 is fixed at the timing synchronized with the falling of the display synchronization signal VD.

Therefore, in a case where the implementation timing of the global shutter drive performed according to the imaging instruction is determined, a time between the implementation timing and the timing synchronized with the falling of the display synchronization signal VD is determined as a maximum exposure time SS2 that can be set as the exposure time at the time of the LV imaging performed immediately after the still image pick up.

Here, the imaging controller 11A determines a proper exposure value of the imager 5 at the time of the LV imaging performed immediately after the still image pick up, for example, based on the picked up image signal obtained by an LV imaging performed immediately before the above described LV imaging.

The imaging condition for obtaining a certain exposure value (the combination of the F-Number of the stop 2, the exposure time of the photoelectric conversion element 61A, and the ISO sensitivity) is determined in advance by a program chart.

The imaging controller 11A determines the imaging condition at the time of the LV imaging immediately after the still image pick up, based on the above described proper exposure value and the program chart.

FIG. 7 exemplifies a case where the proper exposure time SS1 of each display target pixel row 62 in the exposure period LV3 determined based on the proper exposure value and the program chart is smaller than the above described maximum exposure time SS2.

As described above, in a case where the maximum exposure time SS2 is equal to or more than the proper exposure time SS1, the imaging controller 11A sets a first imaging condition determined based on the proper exposure value and the program chart, and performs the LV imaging immediately after the still image pick up.

Figure 8:
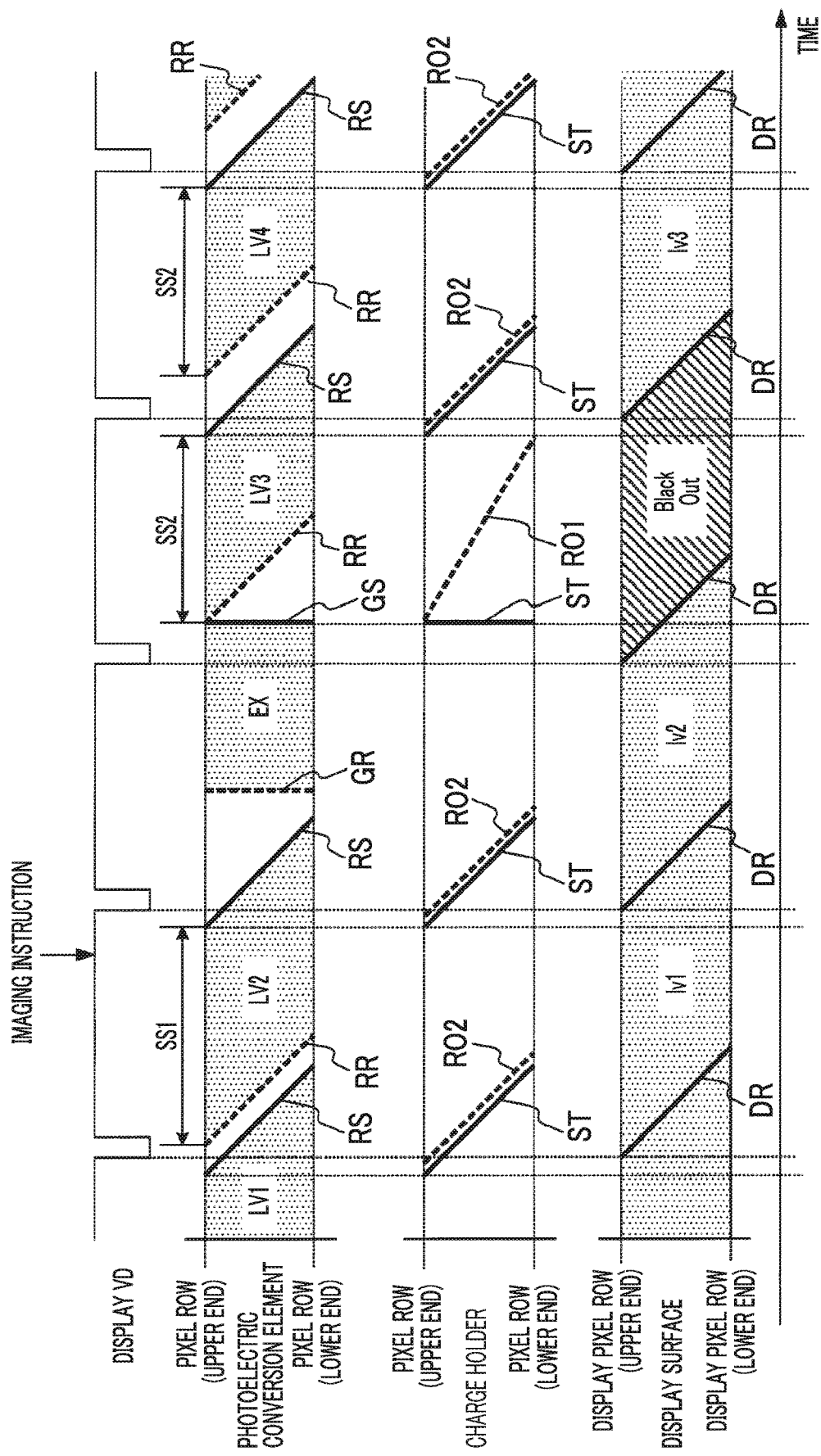
FIG. 8 is a timing chart showing a modification example of the operation in the imaging mode of the digital camera 100 shown in FIG. 1.

FIG. 8 is a timing chart showing a modification example of the operation in the imaging mode of the digital camera 100 shown in FIG. 1.

In contrast with the timing chart shown in FIG. 7, the timing chart shown in FIG. 8 shows an example in which the maximum exposure time SS2 is less than the proper exposure time SS1.

As described above, in a case where the maximum exposure time SS2 is less than the proper exposure time SS1, the imaging controller 11A sets the maximum exposure time SS2 as the imaging condition at the time of the LV imaging immediately after the still image pick up, and further sets, as the imaging condition at the time of the LV imaging immediately after the still image pick up, the proper exposure value calculated by the above described method and the maximum exposure time SS2, and the F-Number of the stop 2 and the ISO sensitivity determined based on the program chart (the F-Number and the ISO sensitivity which can satisfy the above described proper exposure value in a case of the exposure by the maximum exposure time SS2).

Specifically, the imaging controller 11A sets the F-Number at the time of the LV imaging immediately after the exposure period EX in FIG. 8 to an open side with respect to the LV imaging immediately before the exposure period EX in FIG. 8, and sets the ISO sensitivity at the time of the LV imaging immediately after the exposure period EX in FIG. 8 to be higher than that at the time of the LV imaging immediately before the exposure period EX in FIG. 8, so as to secure exposure amounting to a degree by which the exposure time is insufficient.

Figure 9:
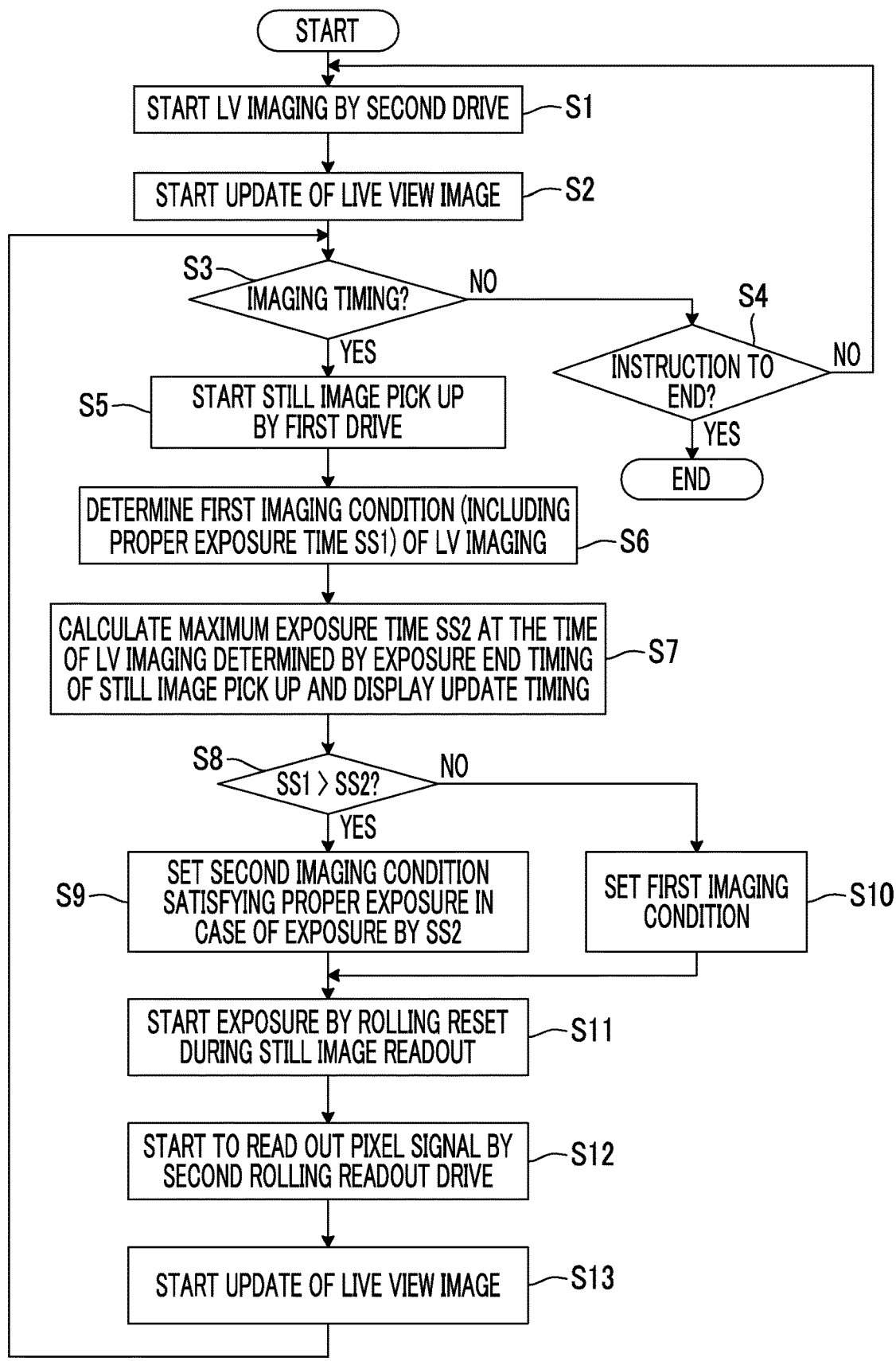
FIG. 9 is a flowchart for describing the operation of the digital camera 100 shown in FIG. 1.

FIG. 9 is a flowchart for describing an operation of the digital camera 100 shown in FIG. 1.

Upon the setting of the imaging mode, the imaging controller 11A starts the LV imaging by the second drive (step S1).

In a case where the second rolling readout drive in the second drive is started and the pixel signal is sequentially read out from the display target pixel row 62, the line image based on the line data generated from the pixel signal is sequentially drawn in the display pixel row 23B, so that the live view image is updated (step S2).

A little after the update of the live view image is started, the imaging controller 11A determines whether it is the timing to perform the still image pick up (step S3). In a case of not the imaging timing (step S3: NO), the imaging controller 11A determines whether an instruction to end the imaging mode has been issued (step S4).

In a case where the instruction to end the imaging mode has been issued (step S4: YES), the imaging controller 11A ends the processing, and in a case where the instruction to end the imaging mode is not issued (step S4: NO), the imaging controller 11A returns the processing to step S1 and starts the second drive for a subsequent LV imaging.

In a case of the imaging timing (step S3: YES), the imaging controller 11A starts the still image pick up by the first drive (step S5).

In a case where the still image pick up starts, the imaging controller 11A determines the first imaging condition for obtaining the proper exposure value at the time of the LV imaging performed immediately after the still image pick up based on the picked up image signal obtained by an immediately previous LV imaging (step S6).

The first imaging condition includes the proper exposure time SS1 determined based on the proper exposure value and the program chart based on the picked up image signal.

In addition, in a case where the still image pick up starts, the imaging controller 11A calculates the maximum exposure time SS2 which can be set at the time of the LV imaging performed immediately after the still image pick up (step S7), based on the start timing of the global shutter drive for the still image pick up (an exposure end timing of the still image pick up), and the falling timing of the display synchronization signal VD (a display update timing) that is a timing after the above described start timing and that comes first after the first rolling readout drive for the still image pick up.

After the processing of step S6 and step S7, the imaging controller 11A determines whether the maximum exposure time SS2 obtained in step S7 is less than the proper exposure time SS1 obtained in step S6 (step S8).

In case where the maximum exposure time SS2 is equal to or more than the proper exposure time SS1 (step S8: NO), the imaging controller 11A sets the imaging condition at the time of the LV imaging performed immediately after the still image pick up to be the first imaging condition determined in step S6 (step S10).

On the other hand, in a case where the maximum exposure time SS2 is less than the proper exposure time SS1 (step S8: YES), the imaging controller 11A sets the exposure time to be the maximum exposure time SS2 and determines the F-Number and the ISO sensitivity for obtaining the proper exposure value determined by the first imaging condition, by the maximum exposure time SS2, so as to determine the F-Number, the ISO sensitivity and the maximum exposure time SS2 to be a second imaging condition at the time of the LV imaging performed immediately after the still image pick up (step S9).

After step S9 and step S10, in a case where the second rolling readout drive of the first drive started in step S5 starts, the imaging controller 11A starts the LV imaging by the second drive under the imaging condition set in step S9 or step S10.

That is, the imaging controller 11A starts the exposure for the LV imaging by the rolling reset drive during the still image readout period (step S11), ends the exposure by the rolling shutter drive, and then performs the second rolling readout drive to read out the pixel signal (step S12).

In a case where the pixel signal is read out from the display target pixel row 62 in step S12, the line image based on the line data generated from the pixel signal is drawn to update the live view image (step S13). After step S13, the processing returns to step S3.

As described above, according to the digital camera 100 of FIG. 1, it is possible to end the exposure period EX for the still image pick up, and to start the exposure period LV3 for the LV imaging during the still image readout period after the exposure period EX.

Therefore, it is possible to shorten the time until the live view image is updated after the exposure period EX (a blackout time in the drawing), and it is possible to reduce the risk of losing sight of the subject.

In addition, according to the digital camera 100 of FIG. 1, in a case where the maximum exposure time SS2 at the time of the LV imaging performed immediately after the still image pick up is less than the proper exposure time SS1, the F-Number and the ISO sensitivity are controlled to obtain the proper exposure value by the maximum exposure time SS2.

Therefore, even in a case where the proper exposure time cannot be secured at the time of the LV imaging performed immediately after the still image pick up, due to the timing when the global shutter drive for the still image pick up is performed, it is possible to display the live view image with the same quality as before.

Figure 10:
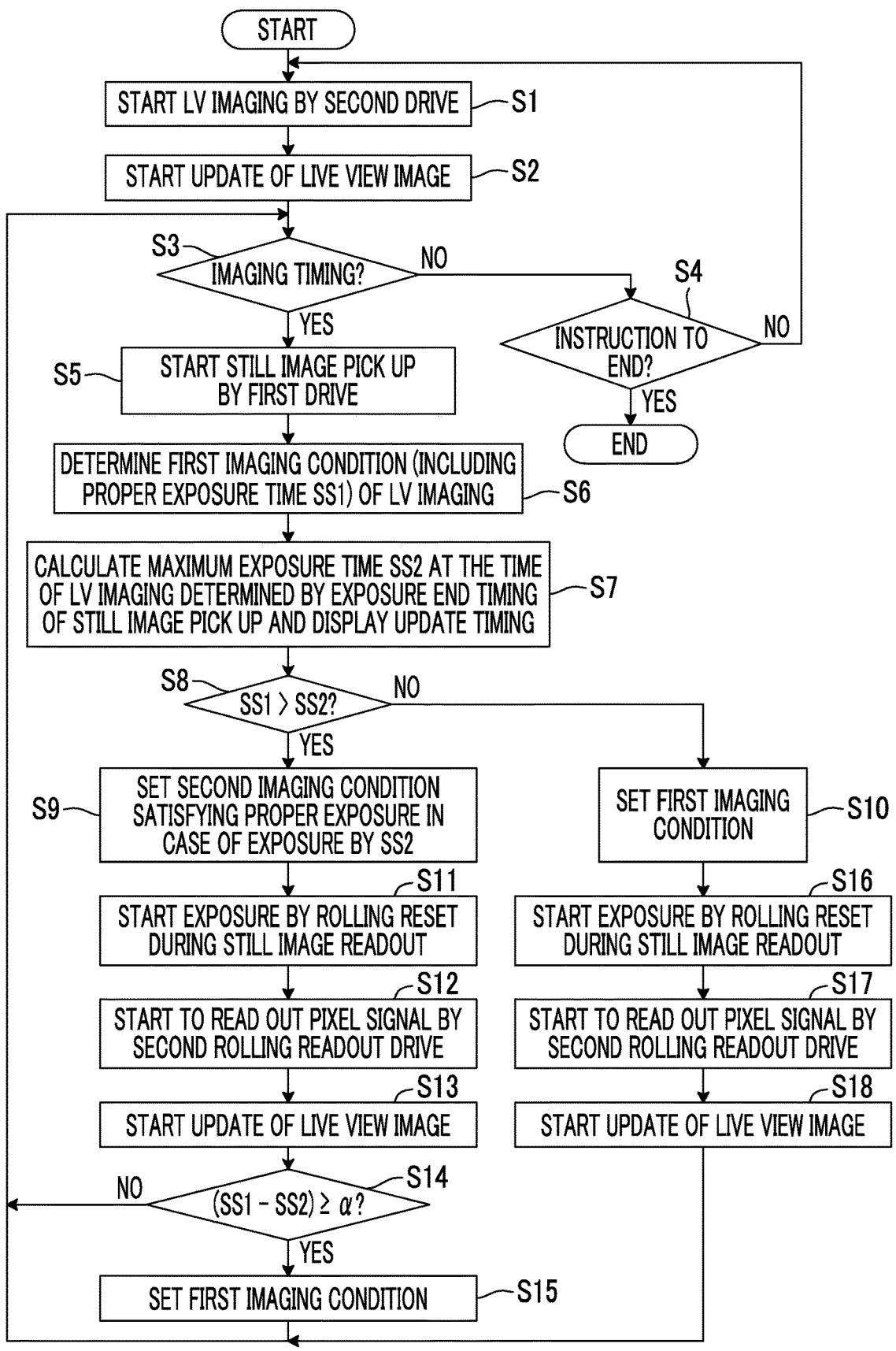
FIG. 10 is a flowchart for describing a modification example of the operation of the digital camera 100 shown in FIG. 1.

FIG. 10 is a flowchart for describing a modification example of the operation of the digital camera 100 shown in FIG. 1. In FIG. 10, the same processing as that of FIG. 9 is denoted by the same reference numerals and signs, and the description thereof will be omitted.

The flowchart shown in FIG. 10 is obtained by adding steps S14 to S18 in the flowchart shown in FIG. 9.

In a case where the display of the live view image, obtained by the LV imaging immediately after the still image pick up, starts in step S13, the imaging controller 11A calculates a time difference between the proper exposure time SS1 determined in step S6 and the maximum exposure time SS2 calculated in step S7, and determines whether the time difference is equal to or more than a predetermined time threshold value a (step S14).

In a case where the time difference is equal to or more than the time threshold value a (step S14: YES), the imaging controller 11A sets the first imaging condition, determined in step S6, as the imaging condition in a case of performing the imaging after the subsequent LV imaging (second and subsequent LV imaging after the still image pick up) (step S15), and the processing returns to step S3. In a case where the processing of step S15 is performed, the exposure is performed under the first imaging condition at the time of the second and subsequent LV imaging after the still image pick up.

Figure 11:
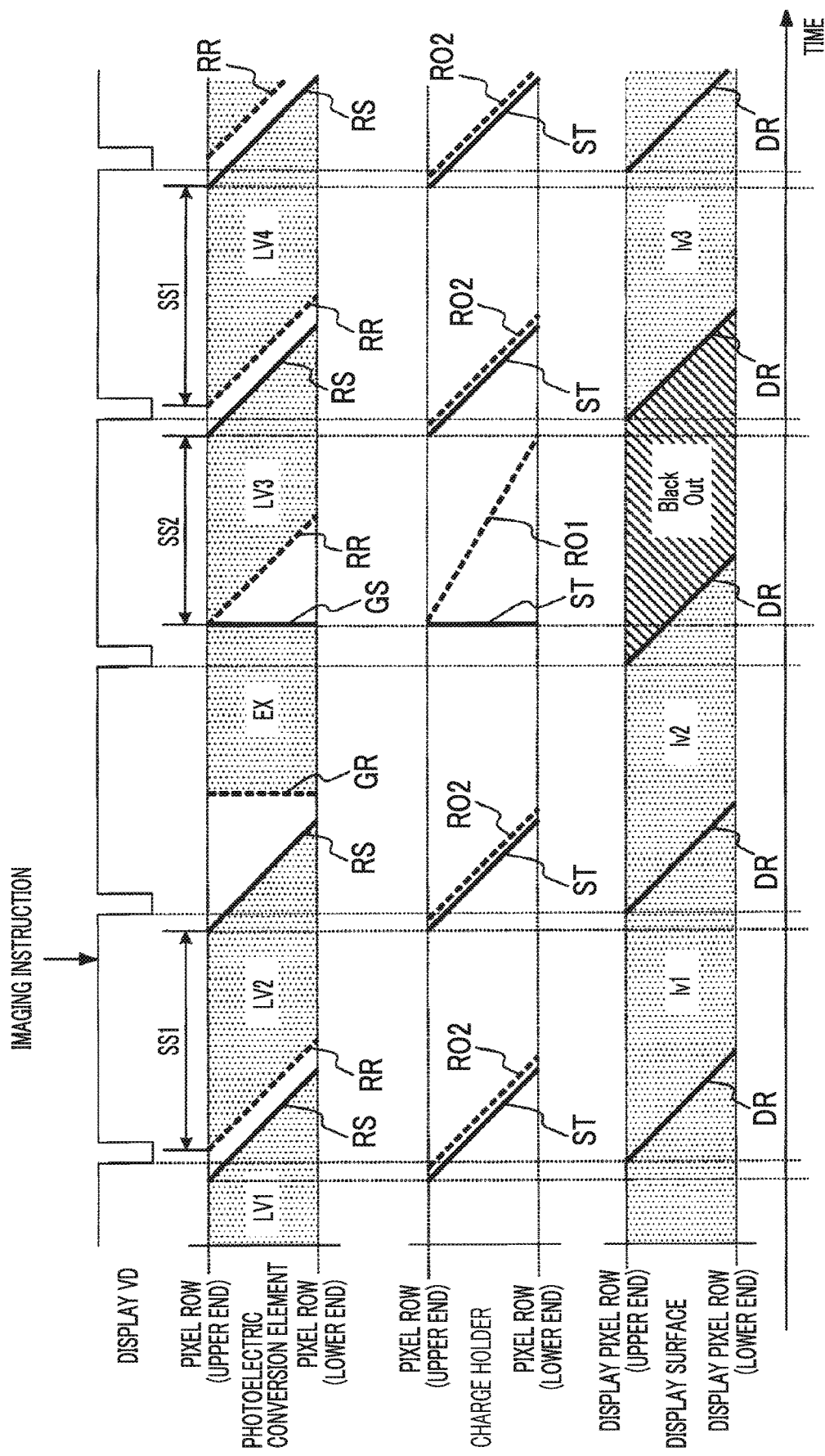
FIG. 11 shows a timing chart in a case where step S15 is performed in the flowchart shown in FIG. 10.

FIG. 11 shows a timing chart in a case where step S15 is performed in the flowchart shown in FIG. 10.

In the example shown in FIG. 11, the imaging condition during the exposure period LV3 immediately after the exposure period EX is set such that the proper exposure value is obtained by the maximum exposure time SS2. The imaging condition during the exposure period LV4 is set such that the proper exposure value is obtained by the proper exposure time SS1 based on the picked up image signal obtained in the exposure period LV2 (the imaging condition in which the ISO sensitivity is lower than that in the imaging condition during the exposure period LV3).

Accordingly, the live view image corresponding to the exposure period LV4 has less noise than the live view image corresponding to the exposure period LV3, and the high image quality can be achieved.

In a case where the time value is less than the time threshold value a (step S14: NO), the imaging controller 11A returns the processing to step S3 without changing the second imaging condition.

After step S10, the imaging controller 11A starts the exposure for the LV imaging by the rolling reset drive during the still image readout period (step S16), ends the exposure by the rolling shutter drive, and then performs the second rolling readout drive to read out the pixel signal (step S17).

In a case where the pixel signal is read out from the display target pixel row 62 in step S17, the line image based on the line data generated from the pixel signal is drawn to update the live view image (step S18). After step S18, the processing returns to step S3.

As described above, according to the modification example shown in FIG. 10, in a case where the time difference between the maximum exposure time SS2 and the proper exposure time SS1 is equal to or more than the time threshold value a, that is, in a case where the ISO sensitivity may be set very high in step S9, the exposure is performed under the first imaging condition of the low ISO sensitivity at the time of the second and subsequent LV imaging after the still image pick up. Therefore, it is possible to improve the display quality by preventing the noise of the live view image from increasing.

In step S15 of FIG. 10, the imaging controller 11A may set the first imaging condition, determined in step S6, as the imaging condition in a case of performing a third and subsequent LV imaging immediately after the still image pick up. Even in this case, it is possible to realize the high image quality by reducing noise of the live view image obtained by the third and subsequent LV imaging after the still image pick up.

According to the operation example shown in FIG. 9 described above, the imaging condition at the time of the LV imaging is necessarily fixed between when the still image pick up is performed and when the subsequent still image pick up is performed. Therefore, a smooth display is possible by making the change of the live view image small.

Figure 12:
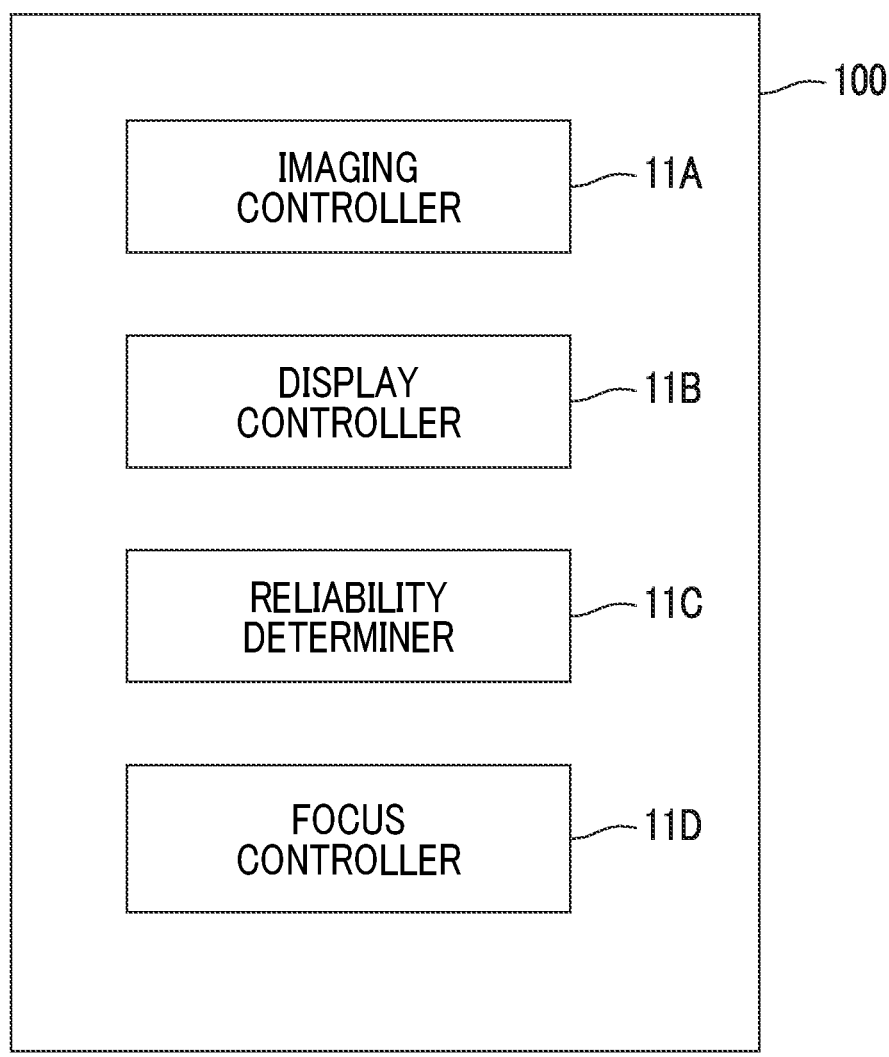
FIG. 12 is a diagram showing a modification example of a functional block of the digital camera 100 shown in FIG. 1.

FIG. 12 is a diagram showing a modification example of a functional block of the digital camera 100 shown in FIG. 1. In FIG. 12, the same configuration as that of FIG. 6 is denoted by the same reference numerals and signs, and the description thereof will be omitted.

The hardware configuration of the digital camera 100 shown in FIG. 12 differs from that in FIG. 1 only in that the plurality of pixels 61 of the imager 5 includes phase difference detection pixels and normal pixels.

A phase difference detection pixel is a first phase difference detection pixel that receives light passing through one of two divided regions in a case where a pupil region of the imaging optical system is divided into two in the row direction X or the column direction Y, and a second phase difference detection pixel that receives light passing through the other of the two divided regions.

A normal pixel is a pixel that receives light passing through each of the two divided regions.

In the imager 5 of the digital camera 100 shown in FIG. 12, parts of the pixels 61 constituting the m display target pixel rows 62 on the imaging surface 60 become the first phase difference detection pixel and the second phase difference detection pixel.

A plurality of pairs of first phase difference detection pixels and second phase difference detection pixels are discretely disposed on the imaging surface 60 of the imager 5.

A configuration may be used, in which the photoelectric conversion elements 61A of all the pixels 61 included in the imager 5 are divided into, for example, two in the row direction X, and by one region and the other region of the divided photoelectric conversion elements 61A, the light, passing through each of the two divided regions of the above described imaging optical system, is received. In a case of this configuration, all the pixels 61 included in the imager 5 become the phase difference detection pixels.

The digital camera 100 shown in FIG. 12 comprises an imaging controller 11A, a display controller 11B, a reliability determiner 11C, and a focus controller 11D, as the functional block.

The system control section 11 of the digital camera 100 shown in FIG. 12 functions as the imaging controller 11A, the display controller 11B, the reliability determiner 11C, and the focus controller 11D by executing the program including the imaging program.

In the digital camera 100 shown in FIG. 12, the continuous shooting mode is mounted as the imaging mode. In the continuous shooting mode, the imaging controller 11A performs the first drives at the constant interval according to one imaging instruction, and implements at least one second drive between the first drives.

The reliability determiner 11C calculates the phase difference based on the pixel signal output from the phase difference detection pixel of the imager 5 by the second rolling readout drive at the time of the LV imaging immediately after the still image pick up.

Specifically, the reliability determiner 11C performs a correlation calculation of the pixel signal group output from the plurality of first phase difference detection pixels, and the pixel signal group output from the second phase difference detection pixel paired with each of the plurality of first phase difference detection pixels, so that the phase difference is determined from a result of the correlation calculation.

In addition, in a case where the maximum exposure time SS2 calculated by the imaging controller 11A is less than the proper exposure time SS1 determined by the imaging controller 11A, the reliability determiner 11C determines the reliability of the calculation result of the phase difference.

In the present specification, the reliability of the calculation result of the phase difference is calculated as a numerical value for specifying a sharpness of a graph showing the above described correlation calculation result (a graph showing a relation between a shift amount of two pixel signal groups and a correlation value of the two pixel signal groups in the shift amount).

The greater the sharpness of the graph is, the more accurately the phase difference of the two image signal groups is obtained. Therefore, in a case where the numerical value indicating the sharpness is equal to or more than a predetermined reliability threshold value TH1, it is possible to secure a sufficient precision of a focus control performed based on the phase difference calculated by the reliability determiner 11C.

In a case where the maximum exposure time SS2 is less than the proper exposure time SS1 and the reliability determiner 11C determines that the reliability of the calculation result of the phase difference is equal to or more than the reliability threshold value TH1, the focus controller 11D obtains a defocus amount of the focus lens included in the imaging optical system based on the phase difference calculated by the reliability determiner 11C, and controls a position of a principal point of the focus lens in accordance with the defocus amount to perform the focus control.

In addition, in a case where the maximum exposure time SS2 is equal to or more than the proper exposure time SS1, the focus controller 11D obtains the defocus amount of the focus lens included in the imaging optical system based on the phase difference calculated by the reliability determiner 11C, and controls the position of the principal point of the focus lens in accordance with the defocus amount to perform the focus control.

Figure 13:
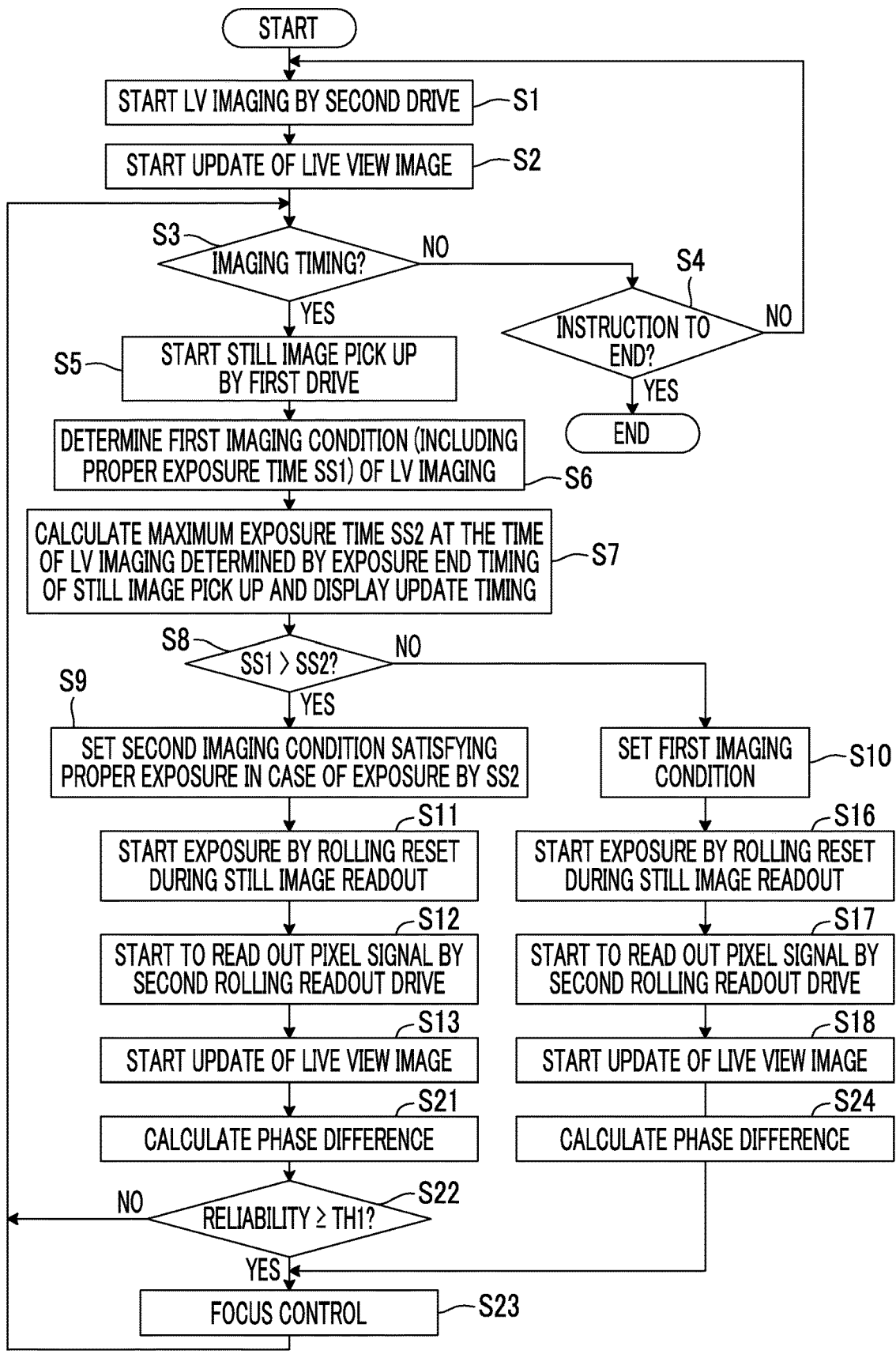
FIG. 13 is a flowchart for describing an operation in a continuous shooting mode of the digital camera 100 shown in FIG. 12.

FIG. 13 is a flowchart for describing an operation in the continuous shooting mode of the digital camera 100 shown in FIG. 12. In FIG. 13, the same processing as that of FIG. 10 is denoted by the same reference numerals and signs, and the description thereof will be omitted.

The flowchart shown in FIG. 13 is obtained by changing steps S14 and S15 to steps S21 to S23 in the flowchart shown in FIG. 10.

In a case where the update of the live view image immediately after the still image pick up starts in step S13, the reliability determiner 11C calculates the phase difference based on the pixel signal read out from the phase difference detection pixel in step S12. (Step S21).

After step S21, the reliability determiner 11C determines whether the reliability of the calculation result of the phase difference in step S21 is equal to or more than the reliability threshold value TH1 (step S22).

In a case where the reliability is determined to be equal to or more than the reliability threshold value TH1 (step S22: YES), the focus controller 11D performs the focus control based on the phase difference calculated in step S21 (step S23), and the processing returns to step S3.

In a case where the reliability is determined to be less than the reliability threshold value TH1 (step S22: NO), the focus controller 11D does not perform the focus control, and the processing returns to step S3.

In addition, in a case where the update of the live view image immediately after the still image pick up starts in step S18, the reliability determiner 11C calculates the phase difference based on the pixel signal read out from the phase difference detection pixel in step S17. (Step S24). After that, in step S23, the focus controller 11D performs the focus control based on the phase difference.

As described above, according to the digital camera 100 shown in FIG. 12, in a case where the maximum exposure time SS2 is less than the proper exposure time SS1, the focus control is performed, only in a case where the reliability of the calculation result of the phase difference using the pixel signal obtained by the LV imaging immediately after the still image pick up is high, based on the phase difference.

For example, as a result of the noise in the pixel signal being increased due to the ISO sensitivity set in step S9, the reliability of the calculation result of the phase difference may decrease. In such a case, the focus control is not performed, so that it is possible to prevent an erroneous focus.

On the other hand, in a case where the maximum exposure time SS2 is less than the proper exposure time SS1, and the reliability of the calculation result of the phase difference is high, the focus control is performed right after the end of the still image pick up. Therefore, the focus speed can be increased, and a tracking performance to the subject can be high.

Figure 14:
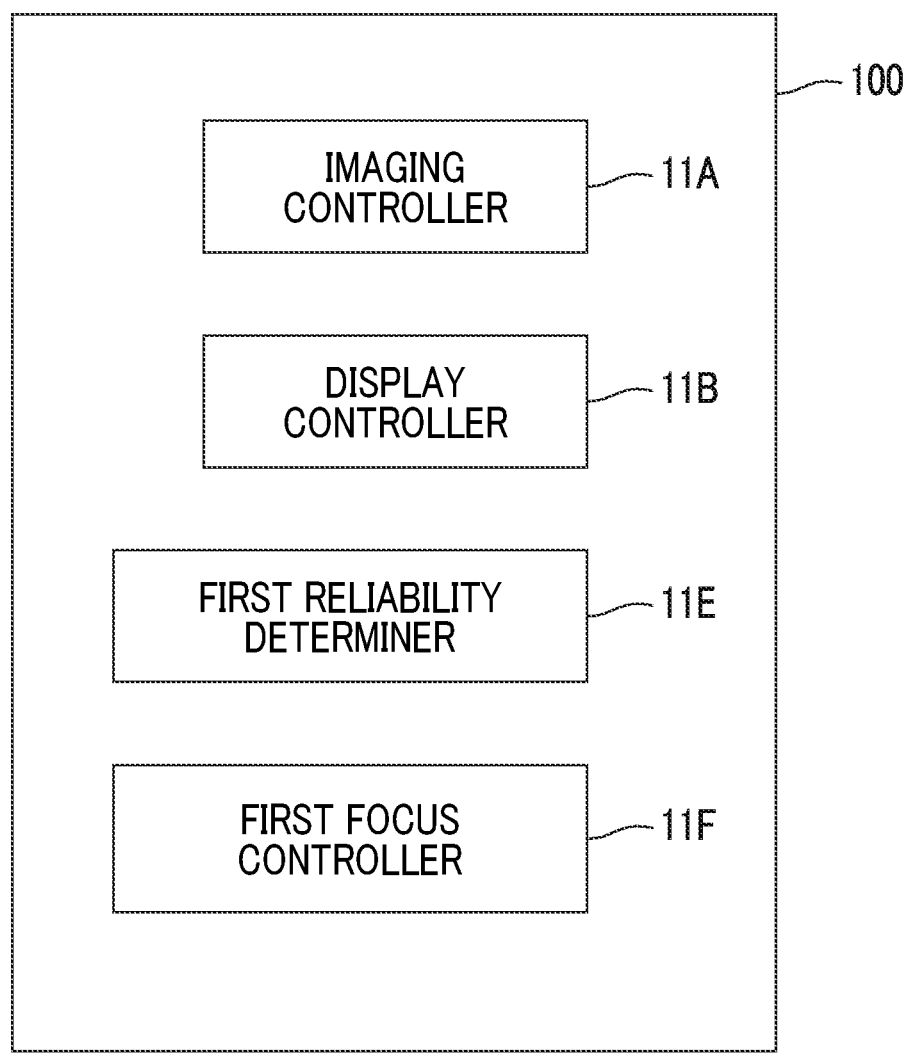
FIG. 14 is a diagram showing a modification example of the functional block of the digital camera 100 shown in FIG. 1.

FIG. 14 is a diagram showing a modification example of a functional block of the digital camera 100 shown in FIG. 1. In FIG. 14, the same configuration as that of FIG. 6 is denoted by the same reference numerals and signs, and the description thereof will be omitted.

The hardware configuration of the digital camera 100 shown in FIG. 14 differs from that in FIG. 1 only in that the plurality of pixels 61 of the imager 5 includes the phase difference detection pixels and the normal pixels.

The system control section 11 of the digital camera 100 shown in FIG. 14 functions as the imaging controller 11A, the display controller 11B, a first reliability determiner 11E, and a first focus controller 11F by executing the program including the imaging program.

In the digital camera 100 shown in FIG. 14, the continuous shooting mode is mounted as the imaging mode. In the continuous shooting mode, according to the imaging instruction, the imaging controller 11A performs the first drives at the constant interval and implements the plurality times of second drives between the first drives.

The first reliability determiner 11E calculates the first phase difference based on the signal output from the phase difference detection pixel by the second drive performed first after the start of the first drive.

In addition, in a case where the maximum exposure time SS2 is less than the proper exposure time SS1, the first reliability determiner 11E determines the first reliability of the calculation result of the calculated first phase difference. The first reliability is obtained similar to the above described reliability of the phase difference, and in a case where the first reliability is equal to or more than the reliability threshold value TH1, it is possible to secure the sufficient precision of the focus control performed based on the first phase difference.

In a case where the maximum exposure time SS2 is less than the proper exposure time SS1 and the first reliability is equal to or more than the reliability threshold value TH1, the first focus controller 11F performs the focus control of the focus lens based on the first phase difference calculated by the first reliability determiner 11E.

In addition, in a case where the first reliability is less than the reliability threshold value TH1, the first focus controller 11F calculates the second phase difference based on the pixel signal output from the phase difference detection pixel by at least the second or later second drive of the plurality times of the second drives performed after the still image pick up, and performs the focus control of the focus lens based on the second phase difference.

Figure 15:
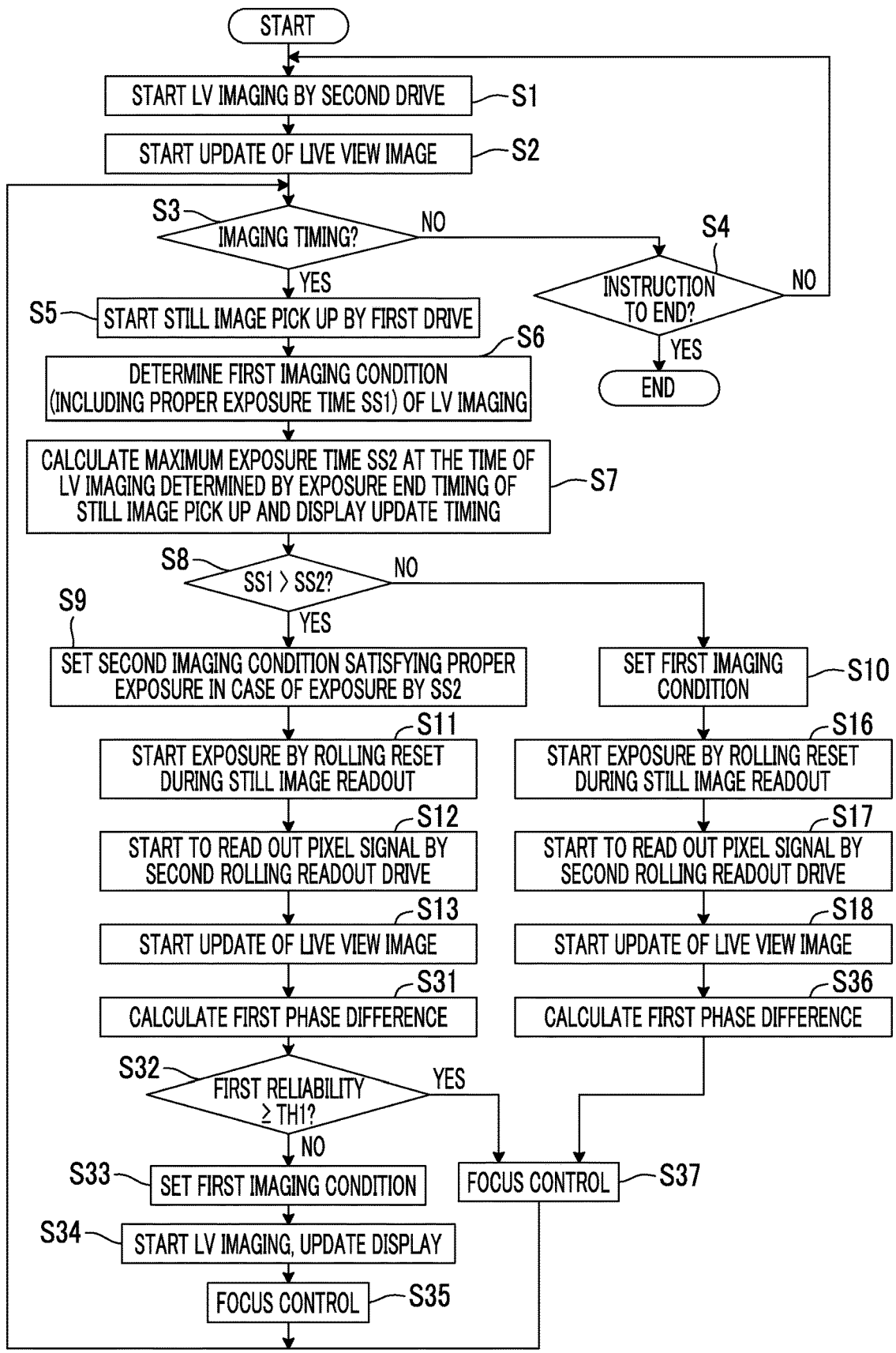
FIG. 15 is a flowchart for describing the operation in the continuous shooting mode of the digital camera 100 shown in FIG. 14.

FIG. 15 is a flowchart for describing an operation in the continuous shooting mode of the digital camera 100 shown in FIG. 14. In FIG. 15, the same processing as that of FIG. 10 is denoted by the same reference numerals and signs, and the description thereof will be omitted.

The flowchart shown in FIG. 15 is obtained by changing steps S14 and S15 to steps S31 to S37 in the flowchart shown in FIG. 10.

After step S18, the first reliability determiner 11E calculates the first phase difference based on the pixel signal read out from the phase difference detection pixel in step S17 (step S36).

In a case where the first phase difference is calculated in step S36, the first focus controller 11F performs focus control based on the first phase difference (step S37). After step S37, the processing returns to step S3.

After step S13, the first reliability determiner 11E calculates the first phase difference based on the pixel signal read out from the phase difference detection pixel in step S12 (step S31).

After step S31, the first reliability determiner 11E determines whether the first reliability of the calculation result of the first phase difference is equal to or more than the reliability threshold value TH1 (step S32).

In a case where the first reliability is determined to be equal to or more than the reliability threshold value TH1 (step S32: YES), the first focus controller 11F performs the focus control based on the first phase difference calculated in step S31, in step S37.

On the other hand, in a case where the first reliability is determined to be less than the reliability threshold value TH1 (step S32: NO), the imaging controller 11A sets, to the first imaging condition determined in step S6, the imaging condition at the time of the LV imaging performed subsequent to the LV imaging started in step S11 (step S33).

After step S33, at the start timing of the LV imaging subsequent to the LV imaging started in step S11, the imaging controller 11A starts the LV imaging by the second drive under the first imaging condition, and the update of the live view image starts based on the pixel signal obtained by the LV imaging (step S34).

After step S34, the first focus controller 11F calculates the second phase difference based on the pixel signal read out from the phase difference detection pixel by the second rolling readout drive in the second drive started in step S34, and performs the focus control based on the second phase difference (step S35). After step S35, the processing returns to step S3.

As described above, according to the digital camera 100 shown in FIG. 14, in a case where the maximum exposure time SS2 is equal to or more than the proper exposure time SS1 and in a case where the maximum exposure time SS2 is less than the proper exposure time SS1 and the reliability of the calculation result of the first phase difference is high, the focus control is performed based on the first phase difference. Therefore, the focus control can be performed right after the end of the still image pick up, and a focus tracking performance to the subject can be high.

In addition, according to the digital camera 100 shown in FIG. 14, in a case where the maximum exposure time SS2 is less than the proper exposure time SS1 and the reliability of the calculation result of the first phase difference is low, the focus control is performed based on the second phase difference calculated from the pixel signal obtained by the second and subsequent LV imaging immediately after the still image pick up.

The second phase difference is obtained by exposing the imager 5 by the proper exposure time SS1. Therefore, the precision of the focus control performed based on the second phase difference can be high.

In the example of FIG. 15, in a case where the determination in step S32 is NO, an assumption is made that the first imaging condition is set at the time of the second LV imaging after the still image pick up, and the focus control is performed based on the pixel signal obtained by the LV imaging. However, the first imaging condition may be set at the time of any of the third and subsequent LV imaging after the still image pick up, and the focus control may be performed based on the pixel signal obtained by the LV imaging.

Figure 16:
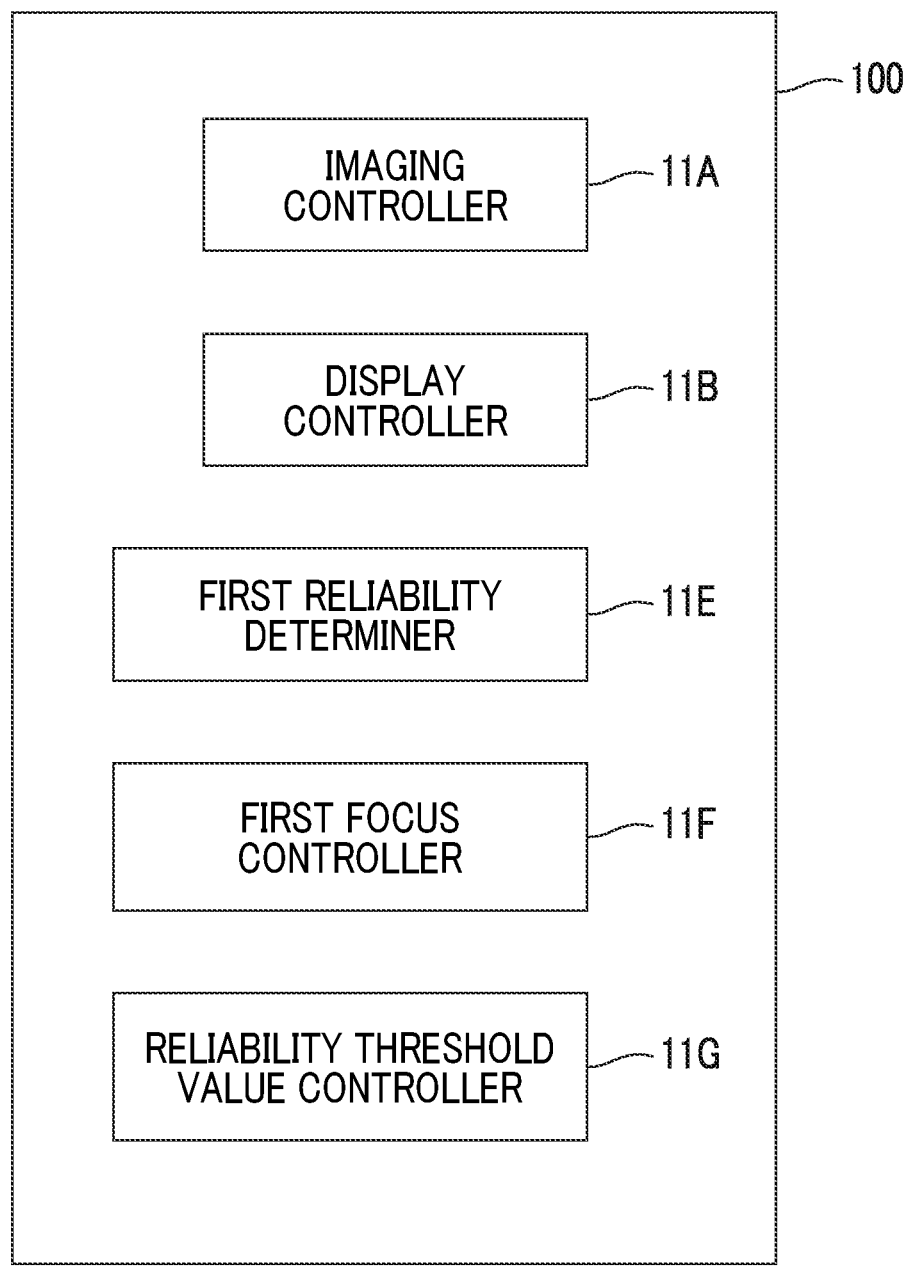
FIG. 16 is a diagram showing a modification example of the functional block of the digital camera 100 shown in FIG. 14.

FIG. 16 is a diagram showing a modification example of a functional block of the digital camera 100 shown in FIG. 14. In FIG. 16, the same configuration as that of FIG. 14 is denoted by the same reference numerals and signs, and the description thereof will be omitted.

The system control section 11 of the digital camera 100 shown in FIG. 16 functions as the imaging controller 11A, the display controller 11B, the first reliability determiner 11E, the first focus controller 11F, and a reliability threshold value controller 11G by executing the program including the imaging program.

The reliability threshold value controller 11G controls the above described reliability threshold value TH1.

The digital camera 100 shown in FIG. 16 has, as the continuous shooting mode, a first mode in which the precision of the focus control is prioritized over an interval for implementing the first drive (the continuous shooting interval), and a second mode in which the interval for implementing the first drive is prioritized over the precision of the focus control.

In the first mode, the reliability threshold value controller 11G controls the reliability threshold value TH1 to be a value greater than that in the second mode.

An expression that the reliability threshold value TH1 is great means that a probability that the determination result in step S32 of FIG. 15 is NO is high. Therefore, a focus precision can be improved in the first mode than in the second mode.

On the other hand, an expression that the reliability threshold value TH1 is small means that the probability that the determination result in step S32 of FIG. 15 is YES is high. That is, since a calculation frequency of the phase difference can be reduced in the second mode, a continuous shooting speed can be faster than in the first mode.

Note that regardless of the first mode and the second mode, in a case where the interval (the continuous shooting interval) for implementing the first drive in the continuous shooting mode is equal to or more than a predetermined interval threshold value, the reliability threshold value controller 11G may control the reliability threshold value TH1 to be a value greater than that in a case where the interval is less than the interval threshold value.

In a case where the continuous shooting interval is long, it is possible to secure sufficient time to implement the focus control between the first drives. Accordingly, in this case, the precision of focus control can be improved by increasing the reliability threshold value TH1 and increasing the probability that the determination in step S32 of FIG. 15 is NO.

Conversely, in a case where the continuous shooting interval is short, there is no room for implementing the focus control between the first drives. Therefore, it is possible to prevent the decrease of the continuous shooting speed by reducing the reliability threshold value TH1 and increasing the probability that the determination in step S32 of FIG. 15 is YES.

Figure 17:
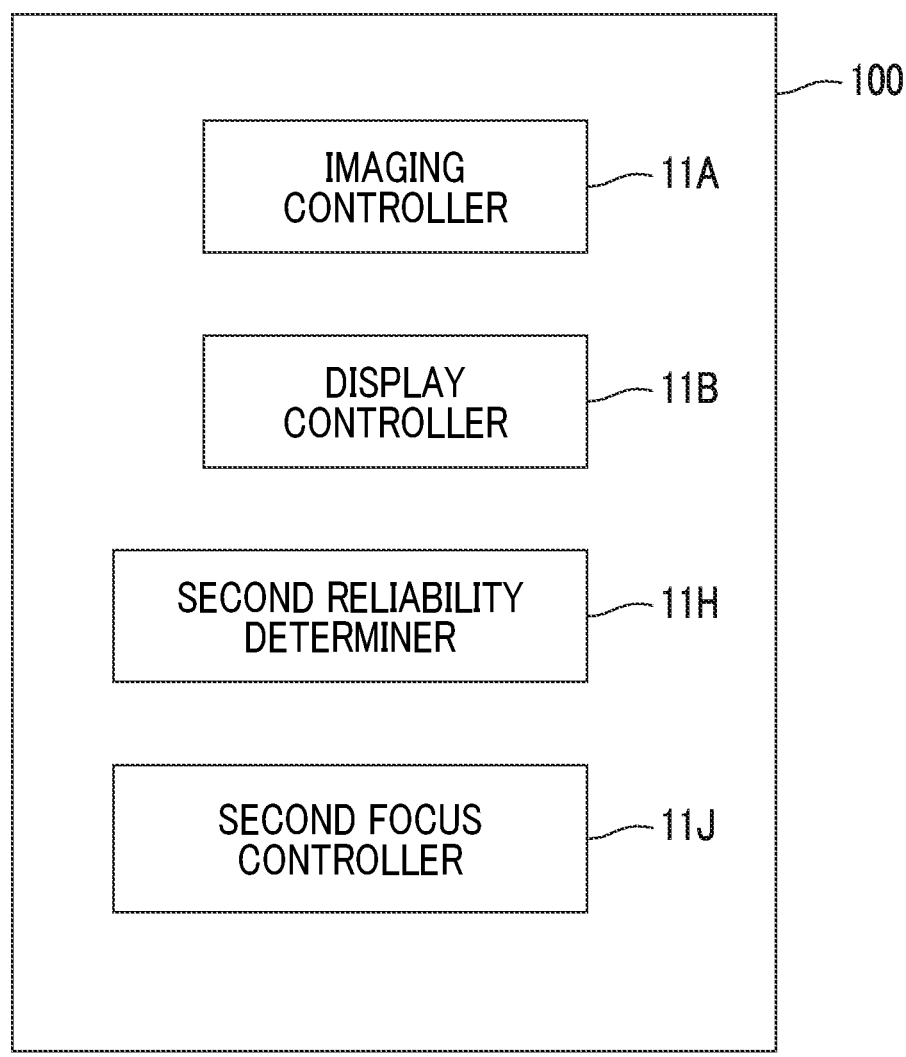
FIG. 17 is a diagram showing a modification example of the functional block of the digital camera 100 shown in FIG. 1.

FIG. 17 is a diagram showing a modification example of a functional block of the digital camera 100 shown in FIG. 1. In FIG. 17, the same configuration as that of FIG. 6 is denoted by the same reference numerals and signs, and the description thereof will be omitted.

The hardware configuration of the digital camera 100 shown in FIG. 17 differs from that in FIG. 1 only in that the plurality of pixels 61 of the imager 5 includes the phase difference detection pixels and the normal pixels.

The system control section 11 of the digital camera 100 shown in FIG. 17 functions as the imaging controller 11A, the display controller 11B, a second reliability determiner 11H, and a second focus controller 11J by executing the program including the imaging program.

In the digital camera 100 shown in FIG. 16, the continuous shooting mode is mounted as the imaging mode. In the continuous shooting mode, according to the imaging instruction, the imaging controller 11A performs the first drives at the constant interval and implements the plurality times of second drives between the first drives.

The second focus controller 11J calculates the phase difference based on the pixel signal output from the phase difference detection pixel by the second drive performed first after the start of each first drive in the continuous shooting mode, and performs the focus control based on the phase difference.

In a case where the maximum exposure time SS2 is less than the proper exposure time SS1 and the second drive is performed first after the still image pick up under the imaging conditions for obtaining the proper exposure value by the maximum exposure time SS2, the second reliability determiner 11H determines the second reliability of the focus control by the second focus controller 11J based on the maximum exposure time SS2 and the proper exposure value.

In a case where the maximum exposure time SS2 is determined, the F-Number of the stop 2 and the ISO sensitivity for obtaining the proper exposure value by the maximum exposure time SS2 are determined.

Here, the second focus controller 11J performs the focus control by a phase difference AF (Auto Focus) type. In the phase difference AF type, in a case where the ISO sensitivity is high and the noise increases in the pixel signal to be a target of the correlation operation, the calculation precision of the phase difference decreases.

In addition, in the phase difference AF type, in a case where the aperture size of the stop 2 at the time of obtaining the pixel signal to be the target of the correlation calculation is small, the phase difference hardly occurs between two images, and the calculation precision of the phase difference decreases.

Accordingly, in a case where the aperture size of the stop 2 determined by the maximum exposure time SS2 and the proper exposure value is equal to or more than a predetermined threshold value TH3 and the ISO sensitivity determined by the maximum exposure time SS2 and the proper exposure value is equal to or less than a predetermined threshold value TH4, the second reliability determiner 11H determines that the second reliability is equal to or more than a reliability threshold value TH2.

In addition, in a case where the aperture size of the stop 2 is less than the threshold value TH3 or the ISO sensitivity exceeds the threshold value TH4, the second reliability determiner 11H determines that the second reliability is less than the reliability threshold value TH2.

In a case where the maximum exposure time SS2 is less than the proper exposure time SS1 and the second reliability is less than the reliability threshold value TH2, the imaging controller 11A of the digital camera 100 shown in FIG. 17 synchronizes a second start timing of the second drive performed immediately after the still image pick up with the display update timing of the display device that comes for the second time after the end of the first rolling readout drive at the time of the still image pick up, and sets the first start timing of the second drive to a timing within the proper exposure time SS1 from the second start timing.

Figure 18:
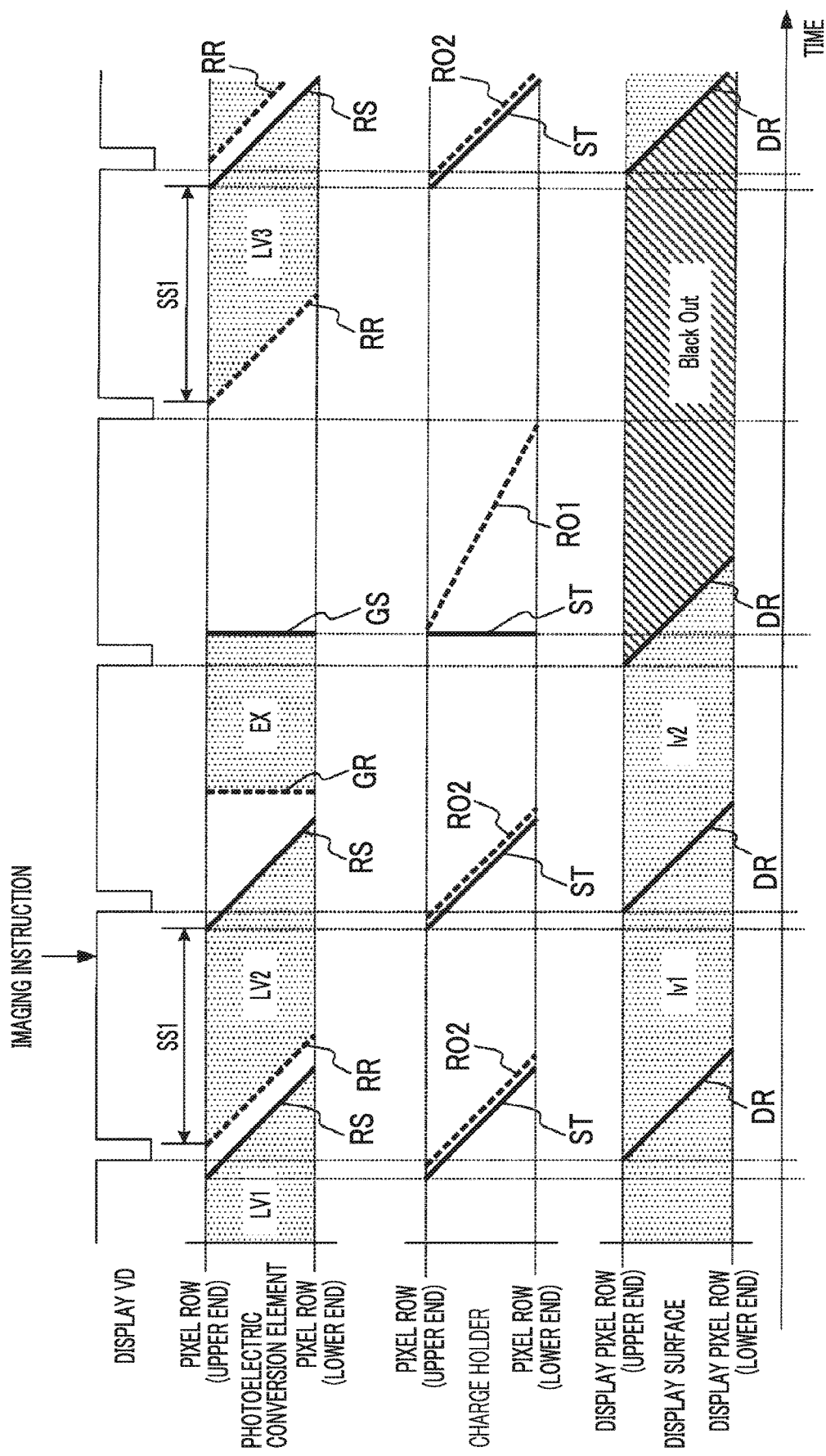
FIG. 18 is a timing chart for describing an example of the operation of the digital camera 100 shown in FIG. 17.

FIG. 18 is a timing chart for describing an example of the operation of the digital camera 100 shown in FIG. 17. FIG. 18 shows an operation example in a case where the second reliability determined by the second reliability determiner 11H is less than the reliability threshold value TH2.

In the example of FIG. 18, at a timing synchronized with the rising timing of the display synchronization signal VD that comes for the second time after the end of the first rolling readout drive indicated by the straight line RO1, the rolling shutter drive for ending the exposure period LV3 starts.

In addition, the rolling reset drive for starting the exposure period LV3 starts at a time within the proper exposure time SS1 from the timing synchronized with the rising timing of the display synchronization signal VD that comes for the second time.

Accordingly, in a case of the operation shown in FIG. 18, although the blackout of the display surface 23 amounts to two frames, it is possible to prevent the focus control from being performed in a state of the low reliability after the still image pick up.

In addition, in a case where the maximum exposure time SS2 is less than the proper exposure time SS1 and the second reliability is equal to or more than the reliability threshold value TH2, the imaging controller 11A of the digital camera 100 shown in FIG. 17 synchronizes the second start timing of the second drive performed immediately after the still image pick up with the display update timing of the display device that comes first after the end of the first rolling readout drive at the time of the still image pick up, and sets the first start timing of the second drive to a timing within the maximum exposure time SS2 from the second start timing.

Figure 19:
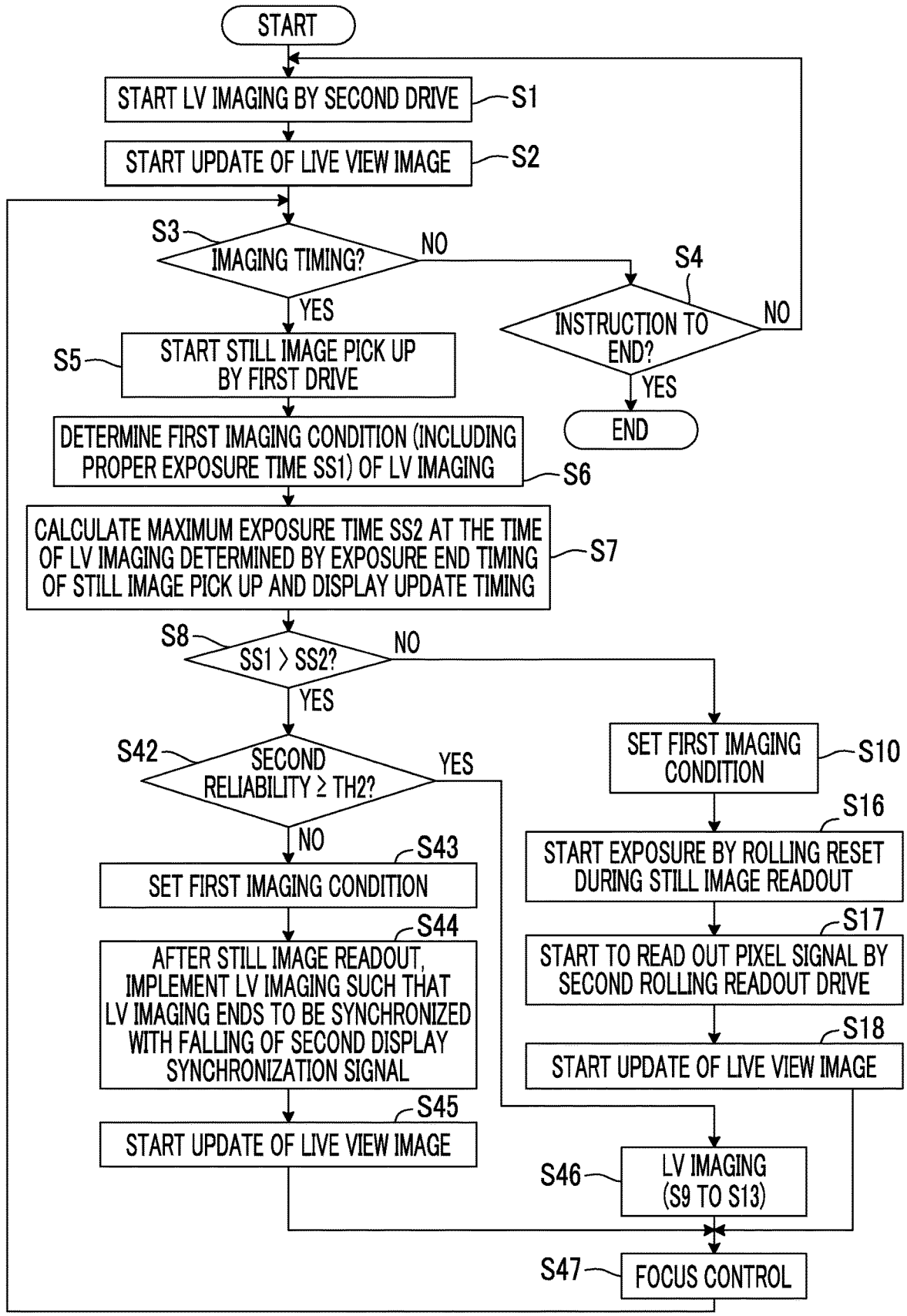
FIG. 19 is a flowchart for describing the operation in the continuous shooting mode of the digital camera 100 shown in FIG. 17.

FIG. 19 is a flowchart for describing an operation in the continuous shooting mode of the digital camera 100 shown in FIG. 17. In FIG. 19, the same processing as that of FIG. 10 is denoted by the same reference numerals and signs, and the description thereof will be omitted.

After step S18, the second focus controller 11J calculates the phase difference based on the pixel signal read out from the phase difference detection pixel in step S17, and performs the focus control based on the phase difference (step S47).

In addition, in a case where the determination in step S8 is YES, the second reliability determiner 11H determines whether the second focus controller 11J determines the second reliability of the focus control performed by the second focus controller 11J based on the maximum exposure time SS2 and the proper exposure value calculated in step S6 (step S42).

In a case where the second reliability is determined to be equal to or more than the reliability threshold value TH2 (step S42: YES), the processing of step S9 to the processing of S13 shown in FIG. 10 are performed (step S46). Then, the second focus controller 11J calculates the phase difference based on the pixel signal read out from the phase difference detection pixel in step S12, and performs the focus control based on the phase difference (step S47).

On the other hand, in a case where the second reliability is determined to be less than the reliability threshold value TH2 (step S42: NO), the imaging controller 11A sets the first imaging condition determined in step S6, as the imaging condition at the time of the LV imaging performed immediately after the still image pick up (step S43).

Thereafter, a little after the end of the first rolling readout drive in the first drive started in step S5, as shown in FIG. 18, the imaging controller 11A starts the rolling reset drive, and at a timing when the proper exposure time SS1 determined in step S6 has elapsed since the start of the rolling reset drive, the imaging controller 11A starts the rolling shutter drive (step S44).

Then, the update of the live view image starts based on the pixel signal read out from the display target pixel row 62 by the rolling shutter drive (step S45), and then based on the pixel signal read out from the phase difference detection pixel by the rolling shutter drive, the focus control is performed by the second focus controller 11J (step S47).

After step S47, the processing returns to step S3, and the LV imaging by the second drive is repeated under the imaging condition set in step S9, step S10, or step S43.

As described above, according to the digital camera 100 shown in FIG. 17, in a case where the maximum exposure time SS2 is less than the proper exposure time SS1, and it is necessary to set the imaging condition at the time of the LV imaging performed immediately after the still image pick up to the second imaging condition for obtaining the proper exposure by the maximum exposure time SS2, and as a result of performing the LV imaging under the second imaging condition, the reliability of the focus control is determined to decrease (step S42: NO), the LV imaging is performed under the first imaging condition, and the focus control is performed based on the pixel signal obtained from the phase difference detection pixel by the LV imaging. Therefore, it is possible to prevent the decrease of the focus precision.

In a case where the determination in step S42 is NO, the LV imaging is performed under the first imaging condition in which the ISO sensitivity is lower than that in the second imaging condition. Therefore, the live view image, updated first after the still image pick up, can have the high quality with less noise.

Figure 20:
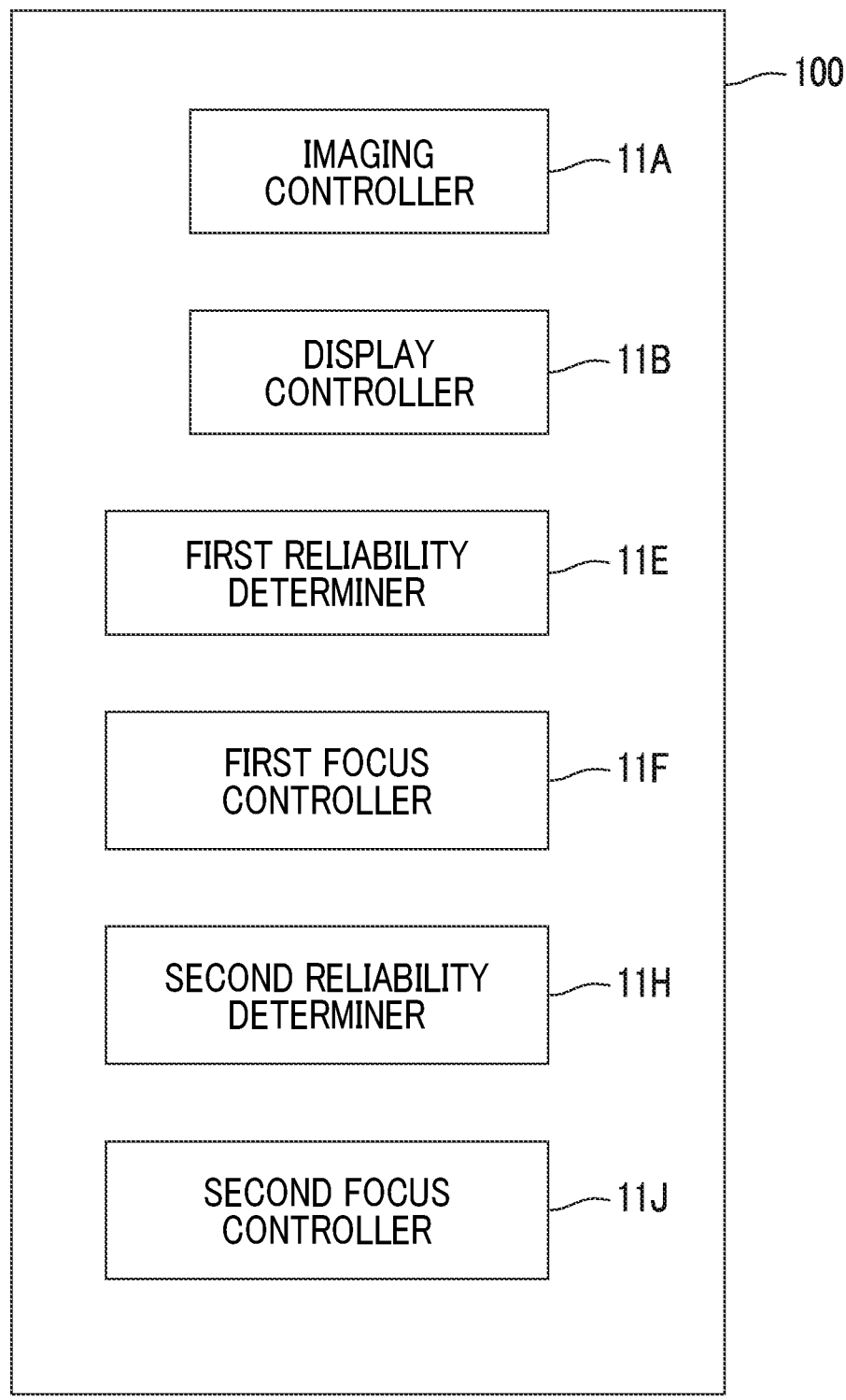
FIG. 20 is a diagram showing a modification example of the functional block of the digital camera 100 shown in FIG. 14.

FIG. 20 is a diagram showing a modification example of a functional block of the digital camera 100 shown in FIG. 14. In FIG. 20, the same configuration as those of FIGS. 14 and 17 is denoted by the same reference numerals and signs, and the description thereof will be omitted. The digital camera 100 shown in FIG. 20 has a configuration in which the second reliability determiner 11H and the second focus controller 11J shown in FIG. 17 as the functional block are added to the digital camera 100 shown in FIG. 14.

The system control section 11 of the digital camera 100 shown in FIG. 20 selectively operates a first function unit that includes the imaging controller 11A, the display controller 11B, the first focus controller 11F and the first reliability determiner 11E, and a second function unit that includes the imaging controller 11A, the display controller 11B, the second focus controller 11J and the second reliability determiner 11H.

That is, the digital camera 100 shown in FIG. 20 can respectively perform the operation shown in FIG. 15 and the operation shown in FIG. 19 in the continuous shooting mode.

By the continuous shooting interval in the continuous shooting mode or a movement amount of the subject being imaged by the imager 5 in the continuous shooting mode, the system control section 11 of the digital camera 100 determines one to operate between the first function unit and the second function unit.

Specifically, in a case where the interval for implementing the first drive in the continuous shooting mode is less than the predetermined interval threshold value, the system control section 11 operates the first function unit, and in a case where the interval is equal to or more than the interval threshold value, the system control section 11 operates the second function unit.

In a case where the interval for implementing the first drive is short, the live view image cannot be updated frequently, and thus the risk of losing the subject is high.

Therefore, in a case where the interval for implementing the first drive is less than the interval threshold value, by operating the first function unit, the blackout period can be reduced as much as possible to reduce the risk of losing sight of the subject.

On the other hand, in a case where the interval for implementing the first drive is long, it is possible to update the live view image frequently, and thus even when the blackout period of the display surface 23 is slightly long, the risk of losing sight of the subject is low.

Therefore, in a case where the interval for implementing the first drive is equal to or more than the interval threshold value, by operating the second function unit, the quality of the live view image and the precision of the focus control can be improved.

In addition, in the continuous shooting mode, the system control section 11 may calculate the movement amount of the subject being imaged from the picked up image signal obtained by the LV imaging and the still image pick up, and in a case where the movement amount is equal to or more than a predetermined movement threshold value, the system control section 11 may operate the first function unit, and in a case where the movement amount is less than the movement threshold value, the system control section 11 may operate the second function unit.

In a case where the movement of the subject being imaged is great, the risk of losing sight of the subject is high during the blackout period of the display surface 23.

Therefore, in a case where the movement amount is equal to or more than the movement threshold value, by operating the first function unit, the blackout period can be reduced as much as possible to reduce the risk of losing sight of the subject.

On the other hand, In a case where the movement of the subject being imaged is small, the risk of losing sight of the subject is low during the blackout period of the display surface 23.

Therefore, in a case where the movement amount is less than the movement threshold value, by operating the first function unit, the quality of the live view image and the precision of the focus control can be improved.

Figure 21:
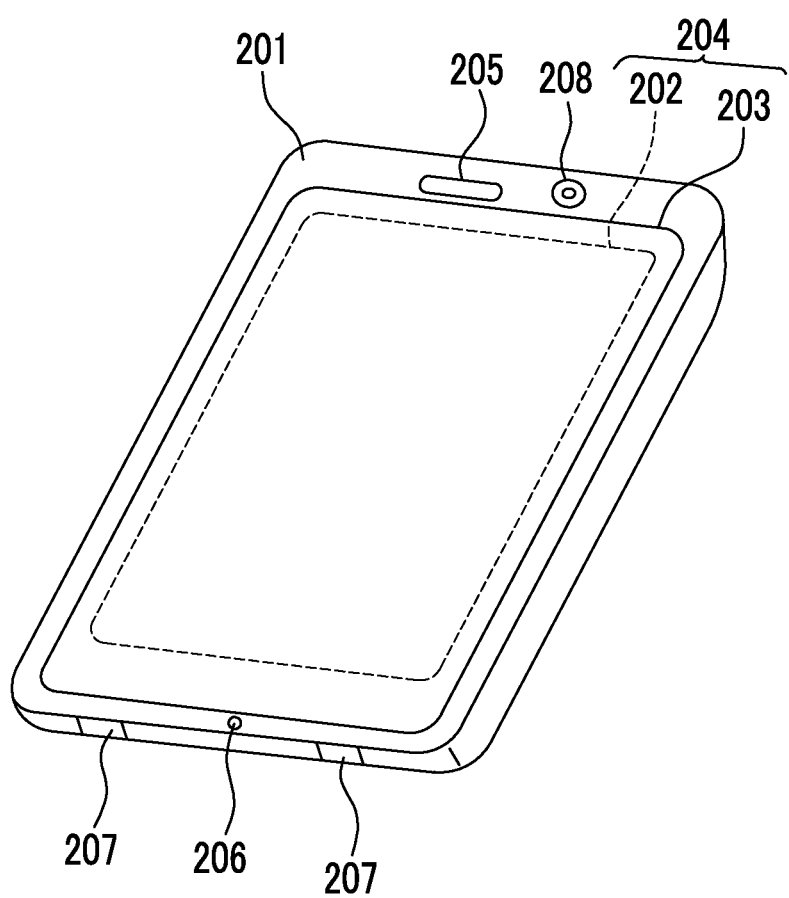
FIG. 21 shows an appearance of a smartphone 200 which is an embodiment of the imaging apparatus of the present invention.

FIG. 21 shows an appearance of a smartphone 200 which is an embodiment of the imaging apparatus of the present invention.

The smartphone 200 shown in FIG. 21 comprises: a housing 201 that has a flat plate shape; a display panel 202 as a display section on one side of the housing 201; and a display input section 204 into which a manipulation panel 203 as an input section is integrated.

In addition, the housing 201 comprises a speaker 205, a microphone 206, manipulation sections 207, and a camera section 208. Note that the configuration of the housing 201 is not limited to this. For example, it is possible to adopt a configuration in which the input section and the display section are independent, or it is possible to adopt a configuration having a slide mechanism or a folded structure.

Figure 22:
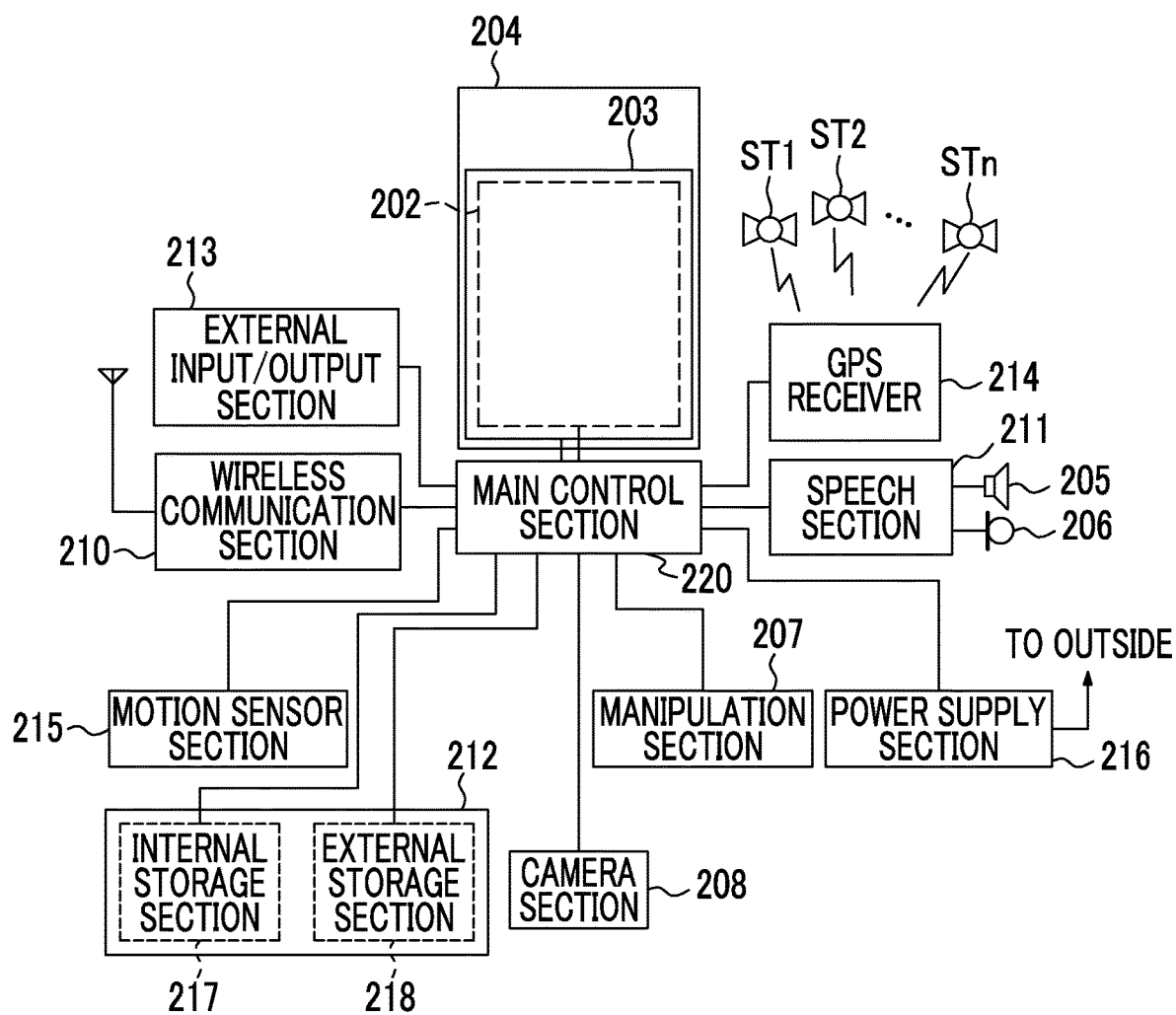
FIG. 22 is a block diagram showing a configuration of the smartphone 200 shown in FIG. 21.

FIG. 22 is a block diagram showing a configuration of the smartphone 200 shown in FIG. 21.

As shown in FIG. 22, the smartphone comprises, as main components, a wireless communication section 210, a display input section 204, a speech section 211, the manipulation sections 207, the camera section 208, a storage section 212, an external input/output section 213, a global positioning system (GPS) receiver 214, a motion sensor section 215, a power supply section 216, and a main control section 220.

As the main function of the smartphone 200, there is provided a wireless communication function of performing mobile wireless communication with a base station apparatus BS, which is not shown, through a mobile communication network NW which is not shown.

The wireless communication section 210 performs wireless communication with the base station device BS, which is included in the mobile communication network NW, in accordance with an instruction of the main control section 220. The wireless communication is used to transmit and receive various types of file data such as audio data and image data, and e-mail data or to receive web data, streaming data, or the like.

The display input section 204 is a so-called touch panel, and comprises the display panel 202 and the manipulation panel 203. The touch panel displays image (still image and moving image) information, text information, or the like so as to visually transport the information to a user in accordance with control of the main control section 220, and detects a user manipulation on the displayed information.

The display panel 202 uses a liquid crystal display (LCD), an organic electro-luminescence display (OELD), or the like as a display device.

The manipulation panel 203 is a device that is mounted for viewing an image which is displayed on a display surface of the display panel 202 and that detects a single coordinate or a plurality of coordinates at which a manipulation is performed by a user's finger or a stylus. In a case where such a device is manipulated by a user's finger or a stylus, the device outputs a detection signal, which is generated due to the manipulation, to the main control section 220. Subsequently, the main control section 220 detects a manipulation position (coordinates) on the display panel 202, on the basis of the received detection signal.

As shown in FIG. 22, the display panel 202 and the manipulation panel 203 of the smartphone 200, which is exemplified as the imaging apparatus according to the above described embodiment of the present invention, are integrated to constitute the display input section 204, and are disposed such that the manipulation panel 203 completely covers the display panel 202.

In a case where such a disposition is adopted, the manipulation panel 203 may have a function of also detecting a user manipulation in a region other than the display panel 202. In other words, the manipulation panel 203 may comprise a detection region (hereinafter referred to as a display region) for a portion which overlaps the display panel 202 and a detection region (hereinafter referred to as a non-display region) for the other portion at the outer edge which does not overlap the display panel 202.

Note that a size of the display region and a size of the display panel 202 may completely coincide with each other, but it is not always necessary for both to coincide with each other. In addition, the manipulation panel 203 may comprise two sensing regions of the outer edge portion and the other inside portion. Furthermore, a width of the outer edge portion is properly designed depending on a size of the housing 201 and the like.

In addition, examples of the position detection method adopted for the manipulation panel 203 can include a matrix switch method, a resistance film method, a surface elastic wave method, an infrared method, an electromagnetic induction method, an electrostatic capacitance method, and the like, and any method can be adopted.

The speech section 211 comprises a speaker 205 or a microphone 206. The speech section 211 converts a sound of a user, which is input through the microphone 206, to sound data, which can be processed in the main control section 220, and outputs the data to the main control section 220, or decodes sound data, which is received by the wireless communication section 210 or the external input/output section 213, and outputs the data from the speaker 205.

In addition, as shown in FIG. 21, for example, the speaker 205 can be mounted on the same surface as the surface on which the display input section 204 is provided. Further, the microphone 206 can be mounted on a side surface of the housing 201.

The manipulation section 207 is a hardware key using a key switch or the like, and receives an instruction from a user. For example, as shown in FIG. 21, the manipulation sections 207 are button type switches which are mounted on the side surface of the housing 201 of the smartphone 200. Each switch is turned on in a case where it is pressed by a finger or the like, and is turned off due to restoring force of a spring when the finger is released.

The storage section 212 stores a control program and control data of the main control section 220, application software, address data in which names, phone numbers, or the like of communication partners are associated, received and transmitted e-mail data, web data which is downloaded by web browsing, or downloaded contents data, and temporarily stores streaming data and the like. In addition, the storage section 212 is constituted of an internal storage section 217, which is built into the smartphone, and an external storage section 218 which has a slot for an attachable and detachable external memory.

In addition, each of the internal storage section 217 and the external storage section 218 constituting the storage section 212 is realized by using a storage medium such as a flash memory type, a hard disk type, a multimedia card micro type, a card type memory (such as a MicroSD (registered trademark) memory), a random access memory (RAM), or a read only memory (ROM).

The external input/output section 213 has a function of an interface with all external devices connected to the smartphone 200. The external input/output section 213 is for communication (such as universal serial bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)), or the like.

Examples of the external devices connected to the smartphone 200 include a wired/wireless headset, a wired/wireless external electric charger, a wired/wireless data port, a memory card which is connected through a card socket, a subscriber identity module (SIM)/user identity module (UIM) card, external audio/video devices which are connected through audio/video input/output (I/O) terminals, external audio/video devices which are connected in a wireless manner, a smartphone which is connected in a wired or wireless manner, a personal computer which is connected in a wired or wireless manner, an earphone a which is connected in a wired or wireless manner, and the like.

The external input/output section 213 can transport the data, which is transmitted from such external devices, to the components within the smartphone 200, and to transmit the data within the smartphone 200 to the external devices.

The GPS receiver 214 receives a plurality of GPS signals, which are transmitted from GPS satellites ST1 to STn, in accordance with instructions of the main control section 220, executes positioning calculation processing on the basis of the received GPS signals, and detects a position formed of a latitude, a longitude, and an altitude of the smartphone 200. The GPS receiver 214 can detect the position by using position information when it is possible to acquire the position information from the wireless communication section 210 or the external input/output section 213 (for example, wireless LAN).

The motion sensor section 215 comprises, for example, a triaxial acceleration sensor, and detects physical movement of the smartphone 200, in accordance with an instruction of the main control section 220. By detecting physical movement of the smartphone 200, an acceleration or a direction of the movement of the smartphone 200 is detected. Such a detection result is output to the main control section 220.

The power supply section 216 supplies the respective sections of the smartphone 200 with electric power, which is stored in a battery (not shown), in accordance with an instruction of the main control section 220.

The main control section 220 comprises a micro processor, and collectively controls the respective sections of the smartphone 200 by performing an operation on the basis of control data and a control program stored in the storage section 212. In addition, the main control section 220 has an application processing function and a mobile communication control function of controlling the respective sections of a communication system in order to perform data communication or sound communication through the wireless communication section 210.

The application processing function is realized by an operation of the main control section 220 using application software stored in the storage section 212. Examples of the application processing function include: an infrared communication function of performing data communication with other devices by controlling the external input/output section 213; an e-mail function of transmitting and receiving e-mails; a web browsing function of browsing web pages; and the like.

In addition, the main control section 220 has an image processing function of displaying a video on the display input section 204 and the like, on the basis of image data (the still image and the moving image data) such as received data or downloaded streaming data.

The image processing function means a function of causing the main control section 220 to decode the image data, apply image processing to the decoding result, and display an image on the display input section 204.

Furthermore, the main control section 220 executes a display control for the display panel 202 and a manipulation detection control to detect the user manipulation through the manipulation sections 207 and the manipulation panel 203.

Through execution of the display control, the main control section 220 displays an icon for activating application software or a window for displaying a software key such as a scroll bar or creating an e-mail.

In addition, the scroll bar means a software key for receiving an instruction to move a display portion of an image on a large image which cannot be entirely shown in the display region of the display panel 202.

In addition, through execution of the manipulation detection control, the main control section 220 detects the user manipulation performed through the manipulation section 207, receives a manipulation performed on the icon and a text input performed in an input field of the window through the manipulation panel 203, or receives a request to scroll a displayed image through the scroll bar.

Furthermore, the main control section 220 has a touch panel control function performed through execution of the manipulation detection control, the function being a function of determining whether the manipulation position of the manipulation panel 203 is in the overlapping portion (the display region) which overlaps with the display panel 202 or the other portion (the non-display region) at the outer edge which does not overlap with the display panel 202, and controlling the display position of the software key or the sensing region of the manipulation panel 203.

In addition, the main control section 220 can detect a gesture manipulation performed on the manipulation panel 203, and can execute a predetermined function according to the detected gesture manipulation.

The gesture manipulation means a manipulation for drawing a locus with a finger or the like, a manipulation of specifying a plurality of positions simultaneously, or a manipulation of drawing loci from a plurality of positions to at least one position as a combination of the above described manipulations, rather than a simple touch manipulation in the related art.

The camera section 208 includes the components other than the external memory control section 20, the storage medium 21, the display device, and the manipulation section 14 in the digital camera 100 shown in FIG. 1.

The picked up image data, which is generated by the camera section 208, can be stored in the storage section 212, or can be output through the external input/output section 213 or the wireless communication section 210.

In the smartphone 200 shown in FIG. 21, the camera section 208 is mounted on the same side as the display input section 204. However, the mounting position of the camera section 208 is not limited to this. The camera section 208 may be mounted on a rear surface of the housing 201.

Further, the camera section 208 can be used in various functions of the smartphone 200. For example, the image acquired by the camera section 208 can be displayed on the display panel 202, or the image of the camera section 208 can be used as one of the manipulation inputs of the manipulation panel 203.

Further, in a case where the GPS receiver 214 detects a position, the GPS receiver 214 can also detect the position with reference to an image obtained from the camera section 208 as well. Furthermore, it is also possible to determine a direction of an optical axis of the camera section 208 of the smartphone 200 or determine a current usage environment, using the GPS receiver 214 in a combination with the triaxial acceleration sensor or without using the triaxial acceleration sensor, with reference to the image obtained from the camera section 208. Needless to say, the image obtained from the camera section 208 can also be used in the application software.

Otherwise, the position information acquired by the GPS receiver 214, the sound information acquired by the microphone 206 (or text information obtained through sound text conversion performed by the main control section or the like), posture information acquired by the motion sensor section 215, and the like can be added to the image data of the still image or the moving image, and the image data can be stored in the storage section 212, or can be output through the external input/output section 213 or the wireless communication section 210.

Also in the smartphone 200 configured as described above, the imaging in which the risk of losing sight of the subject is low is possible.

As described above, the following is described in this specification.

(1) An imaging apparatus comprising:
an imager
that has a plurality of pixels each including a photoelectric conversion element, a charge holder holding a charge transferred from the photoelectric conversion element such that a signal corresponding to the charge is read out by a readout circuit, and a charge discharge region to which the charge of the photoelectric conversion element is discharged without passing through the charge holder,
that comprises a plurality of pixel rows including the plurality of pixels arranged in one direction, and
that images a subject through an imaging optical system;
an imaging controller that performs a first drive and a second drive,
the first drive being of a global shutter type and including
a global reset drive of simultaneously resetting the photoelectric conversion element of each of the plurality of pixels to start exposure of the plurality of pixels,
a global shutter drive of simultaneously transferring, to the charge holder, charges accumulated in the photoelectric conversion element of each of the plurality of pixels by the exposure to end the exposure, and
a first rolling readout drive of sequentially reading out, for each of the pixel rows, the signal corresponding to the charge held in the charge holder by the global shutter drive,
the second drive being of a rolling shutter type and including
a rolling reset drive of sequentially performing processing of discharging the charge of the photoelectric conversion element of the pixel row to the charge discharge region to start the exposure of the photoelectric conversion element, while changing the pixel rows,
a rolling shutter drive of sequentially performing processing of transferring, to the charge holder, the charge accumulated in the photoelectric conversion element of the pixel row for which the exposure has been started by the rolling reset drive to end the exposure of the pixel row, while changing the pixel rows, and
a second rolling readout drive of sequentially reading out the signal corresponding to the charge held in the charge holder of the pixel row by the rolling shutter drive, while changing the pixel rows; and
a display controller that displays, on a display device, a live view image generated based on the signal output from the pixel of the imager by the second drive, wherein a time required for the first rolling readout drive is longer than a time required for each of the rolling reset drive, the rolling shutter drive, and the second rolling readout drive, and wherein, in an imaging mode in which the imaging controller performs the first drive while continuously performing the second drive, the imaging controller sets a first start timing of the second drive performed first after a start of the first drive to be during an implementation period of the first rolling readout drive in the first drive, and synchronizes a second start timing of the rolling shutter drive performed first after the start of the first drive with a display update timing of the display device that comes first after an end of the first rolling readout drive.

(2) The imaging apparatus described in (1), wherein in a case where a maximum exposure time between an earliest timing that is capable of being set as the first start timing and the second start timing is less than a proper exposure time for obtaining a proper exposure value determined by a brightness of the subject imaged by the imager, the imaging controller sets the first start timing to be the earliest timing, and sets an imaging condition set at the first start timing to be a condition for obtaining the proper exposure value.

(3) The imaging apparatus described in (2), wherein the imaging mode is a mode in which processing of performing the second drive at least once after the start of the first drive is continuously performed a plurality of times, and wherein the plurality of pixels of the imager includes phase difference detection pixels, the imaging apparatus further comprising:

a reliability determiner that calculates a phase difference based on the signal output from the phase difference detection pixel by the second drive performed after the start of the first drive, and in a case where the maximum exposure time is less than the proper exposure time, determines a reliability of a calculation result of the phase difference; and a focus controller that performs a focus control of a focus lens included in the imaging optical system based on the phase difference in a case where the reliability is equal to or more than a reliability threshold value.

(4) The imaging apparatus described in (2), wherein the imaging mode is a mode in which the second drive is continuously performed a plurality of times after the start of the first drive, and wherein in a case where the maximum exposure time is less than the proper exposure time and a difference between the proper exposure time and the maximum exposure time is equal to or more than a predetermined time threshold value, the imaging controller sets an exposure time of the photoelectric conversion element in at least the second and subsequent second drives of the plurality of times of second drives to be the proper exposure time.

(5) The imaging apparatus described in (2), wherein the imaging mode is a mode in which processing of performing the second drive a plurality of times after the start of the first drive is continuously performed a plurality of times, and wherein the plurality of pixels of the imager includes phase difference detection pixels, the imaging apparatus further comprising:

a first reliability determiner that calculates a first phase difference based on the signal output from the phase difference detection pixel by the second drive performed first after the start of the first drive, and in a case where the maximum exposure time is less than the proper exposure time, determines a first reliability of a calculation result of the first phase difference; and a first focus controller that performs a focus control of a focus lens included in the imaging optical system based on the first phase difference in a case where the first reliability is equal to or more than a reliability threshold value, and performs a focus control of the focus lens based on a second phase difference calculated from the signal output from the phase difference detection pixel by at least the second and subsequent second drives of the plurality of times of second drives in a case where the first reliability is less than the reliability threshold value, wherein in a case where the first reliability is less than the reliability threshold value, the imaging controller sets the exposure time of the photoelectric conversion element in at least the second and subsequent second drives to be the proper exposure time.

(6) The imaging apparatus described in (5), further comprising:

a reliability threshold value controller that controls the reliability threshold value.

(7) The imaging apparatus described in (6), wherein the imaging mode includes a first mode in which a precision of the focus control is prioritized over an interval for implementing the first drive, and a second mode in which the interval for implementing the first drive is prioritized over the precision of the focus control, and wherein in the first mode, the reliability threshold value controller controls the reliability threshold value to be a value higher than that of the second mode.

(8) The imaging apparatus described in (6), wherein in a case where the interval for implementing the first drive is equal to or more than a predetermined interval threshold value, the reliability threshold value controller controls the reliability threshold value to be a value greater than that in a case where the interval is less than the interval threshold value.

(9) The imaging apparatus described in (1), wherein the imaging mode is a mode in which processing of performing the second drive a plurality of times after the start of the first drive is continuously performed a plurality of times, and wherein the plurality of pixels of the imager includes phase difference detection pixels, the imaging apparatus further comprising:

a second focus controller that performs a focus control of a focus lens included in the imaging optical system, based on a signal output from the phase difference detection pixel by the first performed second drive; and a second reliability determiner that determines, in a case where a maximum exposure time between an earliest timing that is capable of being set as the first start timing and the second start timing is less than a proper exposure time for obtaining a proper exposure value determined by a brightness of the subject imaged by the imager, a second reliability of the focus control in a case where the second drive is performed first under an imaging condition for obtaining the proper exposure value by the maximum exposure time, based on the maximum exposure time and the proper exposure value, wherein in a case where the second reliability is less than a reliability threshold value, the imaging controller synchronizes the second start timing with a display update timing of the display device that comes for the second time after the end of the first rolling readout drive, and sets the first start timing to a timing within the proper exposure time from the second start timing, and in a case where the second reliability is equal to or more than the reliability threshold value, the imaging controller synchronizes the second start timing with the display update timing of the display device that comes first after the end of the first rolling readout drive, and sets the first start timing to a timing within the maximum exposure time from the second start timing.

(10) The imaging apparatus described in (5), further comprising:

a second focus controller that performs a focus control of the focus lens included in the imaging optical system, based on a signal output from the phase difference detection pixel by the first performed second drive; and a second reliability determiner that determines, in a case where a maximum exposure time between an earliest timing that is capable of being set as the first start timing and the second start timing is less than a proper exposure time for obtaining a proper exposure value determined by a brightness of the subject imaged by the imager, a second reliability of the focus control in a case where the second drive is performed first under an imaging condition for obtaining the proper exposure value by the maximum exposure time, based on the maximum exposure time and the proper exposure value, wherein in a case where the second reliability is less than a reliability threshold value, the imaging controller synchronizes the second start timing with a display update timing of the display device that comes for the second time after the end of the first rolling readout drive, and sets the first start timing to a timing within the proper exposure time from the second start timing, and in a case where the second reliability is equal to or more than the reliability threshold value, the imaging controller synchronizes the second start timing with the display update timing of the display device that comes first after the end of the first rolling readout drive, and sets the first start timing to a timing within the maximum exposure time from the second start timing, and wherein a first function unit and a second function unit are selectively operated, the first function unit including the imaging controller, the display controller, the first focus controller and the first reliability determiner, and the second function unit including the imaging controller, the display controller, the second focus controller and the second reliability determiner.

(11) The imaging apparatus described in (10),
wherein the first function unit is operated in a case where an interval for implementing the first drive is less than a predetermined interval threshold value, and wherein the second function unit is operated in a case where the interval is equal to or more than the interval threshold value.

(12) The imaging apparatus described in (10),
wherein the first function unit is operated in a case where a movement amount of the subject being imaged by the imager is equal to or more than a predetermined movement threshold value, and wherein the second function unit is operated in a case where the movement amount is less than the movement threshold value.

(13) An imaging method using an imager
that has a plurality of pixels each including a photoelectric conversion element, a charge holder holding a charge transferred from the photoelectric conversion element such that a signal corresponding to the charge is read out by a readout circuit, and a charge discharge region to which the charge of the photoelectric conversion element is discharged without passing through the charge holder, that comprises a plurality of pixel rows including the plurality of pixels arranged in one direction, and that images a subject through an imaging optical system, the imaging method comprising:

an imaging control step of performing a first drive and a second drive, the first drive being of a global shutter type and including
a global reset drive of simultaneously resetting the photoelectric conversion element of each of the plurality of pixels to start exposure of the plurality of pixels, a global shutter drive of simultaneously transferring, to the charge holder, charges accumulated in the photoelectric conversion element of each of the plurality of pixels by the exposure to end the exposure, and a first rolling readout drive of sequentially reading out, for each of the pixel rows, the signal corresponding to the charge held in the charge holder by the global shutter drive, the second drive being of a rolling shutter type and including a rolling reset drive of sequentially performing processing of discharging the charge of the photoelectric conversion element of the pixel row to the charge discharge region to start the exposure of the photoelectric conversion element, while changing the pixel rows, a rolling shutter drive of sequentially performing processing of transferring, to the charge holder, the charge accumulated in the photoelectric conversion element of the pixel row for which the exposure has been started by the rolling reset drive to end the exposure of the pixel row, while changing the pixel rows, and a second rolling readout drive of sequentially reading out the signal corresponding to the charge held in the charge holder of the pixel row by the rolling shutter drive, while changing the pixel rows; and a display control step of displaying, on a display device, a live view image generated based on the signal output from the pixel of the imager by the second drive, wherein a time required for the first rolling readout drive is longer than a time required for each of the rolling reset drive, the rolling shutter drive, and the second rolling readout drive, and wherein, in the imaging control step, in an imaging mode in which the first drive is performed while the second drive is continuously performed, a first start timing of the second drive performed first after a start of the first drive is set to be during an implementation period of the first rolling readout drive in the first drive, and a second start timing of the rolling shutter drive performed first after the start of the first drive is synchronized with a display update timing of the display device that comes first after an end of the first rolling readout drive.

(14) The imaging method described in (13),
wherein in the imaging control step, in a case where a maximum exposure time between an earliest timing that is capable of being set as the first start timing and the second start timing is less than a proper exposure time for obtaining a proper exposure value determined by a brightness of the subject imaged by the imager, the first start timing is set to be the earliest timing, and an imaging condition set at the first start timing is set to be a condition for obtaining the proper exposure value.

(15) The imaging method described in (14),
wherein the imaging mode is a mode in which processing of performing the second drive at least once after the start of the first drive is continuously performed a plurality of times, and
wherein the plurality of pixels of the imager includes phase difference detection pixels,
the imaging method, further comprising:
a reliability determination step of calculating a phase difference based on the signal output from the phase difference detection pixel by the second drive performed after the start of the first drive, and in a case where the maximum exposure time is less than the proper exposure time, determining a reliability of a calculation result of the phase difference; and
a focus control step of performing a focus control of a focus lens included in the imaging optical system based on the phase difference in a case where the reliability is equal to or more than a reliability threshold value.

(16) The imaging method described in (14),
wherein the imaging mode is a mode in which the second drive is continuously performed a plurality of times after the start of the first drive, and
wherein in the imaging control step, in a case where the maximum exposure time is less than the proper exposure time and a difference between the proper exposure time and the maximum exposure time is equal to or more than a predetermined time threshold value, an exposure time of the photoelectric conversion element in at least the second and subsequent second drives of the plurality of times of second drives is set to be the proper exposure time.

(17) The imaging method described in (14),
wherein the imaging mode is a mode in which processing of performing the second drive a plurality of times after the start of the first drive is continuously performed a plurality of times, and
wherein the plurality of pixels of the imager includes phase difference detection pixels,
the imaging method, further comprising:
a first reliability determination step of calculating a first phase difference based on the signal output from the phase difference detection pixel by the second drive performed first after the start of the first drive, and in a case where the maximum exposure time is less than the proper exposure time, determining a first reliability of a calculation result of the first phase difference; and
a first focus control step of performing a focus control of a focus lens included in the imaging optical system based on the first phase difference in a case where the first reliability is equal to or more than a reliability threshold value, and performing a focus control of the focus lens based on a second phase difference calculated from the signal output from the phase difference detection pixel by at least the second and subsequent second drives of the plurality of times of second drives in a case where the first reliability is less than the reliability threshold value,
wherein in the imaging control step, in a case where the first reliability is less than the reliability threshold value, the exposure time of the photoelectric conversion element in at least the second and subsequent second drives is set to be the proper exposure time.

(18) The imaging method described in (17), further comprising:
a reliability threshold value control step of controlling the reliability threshold value.

(19) The imaging method described in (18),
wherein the imaging mode includes a first mode in which a precision of the focus control is prioritized over an interval for implementing the first drive, and a second mode in which the interval for implementing the first drive is prioritized over the precision of the focus control, and
wherein in the reliability threshold value control step, in the first mode, the reliability threshold value is controlled to be a value higher than that of the second mode.

(20) The imaging method described in (18),
wherein in the reliability threshold value control step, in a case where the interval for implementing the first drive is equal to or more than a predetermined interval threshold value, the reliability threshold value is controlled to be a value greater than that in a case where the interval is less than the interval threshold value.

(21) The imaging method described in (13),
wherein the imaging mode is a mode in which processing of performing the second drive a plurality of times after the start of the first drive is continuously performed a plurality of times, and
wherein the plurality of pixels of the imager includes phase difference detection pixels,
the imaging method, further comprising:
a second focus control step of performing a focus control of a focus lens included in the imaging optical system, based on a signal output from the phase difference detection pixel by the first performed second drive; and
a second reliability determination step of determining, in a case where a maximum exposure time between an earliest timing that is capable of being set as the first start timing and the second start timing is less than a proper exposure time for obtaining a proper exposure value determined by a brightness of the subject imaged by the imager, a second reliability of the focus control in a case where the second drive is performed first under an imaging condition for obtaining the proper exposure value by the maximum exposure time, based on the maximum exposure time and the proper exposure value,
wherein in the imaging control step, in a case where the second reliability is less than a reliability threshold value, the second start timing is synchronized with a display update timing of the display device that comes for the second time after the end of the first rolling readout drive, and the first start timing is set to a timing within the proper exposure time from the second start timing, and in a case where the second reliability is equal to or more than the reliability threshold value, the second start timing is synchronized with the display update timing of the display device that comes first after the end of the first rolling readout drive, and the first start timing is set to a timing within the maximum exposure time from the second start timing.

(22) The imaging method described in (17), further comprising:
a second focus control step of performing a focus control of the focus lens included in the imaging optical system, based on a signal output from the phase difference detection pixel by the first performed second drive; and
a second reliability determination step of determining, in a case where a maximum exposure time between an earliest timing that is capable of being set as the first start timing and the second start timing is less than a proper exposure time for obtaining a proper exposure value determined by a brightness of the subject imaged by the imager, a second reliability of the focus control in a case where the second drive is performed first under an imaging condition for obtaining the proper exposure value by the maximum exposure time, based on the maximum exposure time and the proper exposure value, wherein in the imaging control step, in a case where the second reliability is less than a reliability threshold value, the second start timing is synchronized with a display update timing of the display device that comes for the second time after the end of the first rolling readout drive, and the first start timing is set to a timing within the proper exposure time from the second start timing, and in a case where the second reliability is equal to or more than the reliability threshold value, the second start timing is synchronized with the display update timing of the display device that comes first after the end of the first rolling readout drive, and the first start timing is set to a timing within the maximum exposure time from the second start timing.

wherein a first function and a second function are selectively enabled, the first function including the imaging control step, the display control step, the first focus control step and the first reliability determination step, and the second function including the imaging control step, the display control step, the second focus control step and the second reliability determination step.

(23) The imaging method described in (22), wherein the first function is enabled in a case where an interval for implementing the first drive is less than a predetermined interval threshold value, and wherein the second function is enabled in a case where the interval is equal to or more than the interval threshold value.

(24) The imaging method described in (22), wherein the first function is enabled in a case where a movement amount of the subject being imaged by the imager is equal to or more than a predetermined movement threshold value, and wherein the second function is enabled in a case where the movement amount is less than the movement threshold value.

(25) An imaging program causing a computer to execute an imaging method using an imager that has a plurality of pixels each including a photoelectric conversion element, a charge holder holding a charge transferred from the photoelectric conversion element such that a signal corresponding to the charge is read out by a readout circuit, and a charge discharge region to which the charge of the photoelectric conversion element is discharged without passing through the charge holder, that comprises a plurality of pixel rows including the plurality of pixels arranged in one direction, and that images a subject through an imaging optical system, the imaging method comprising:

an imaging control step of performing a first drive and a second drive, the first drive being of a global shutter type and including a global reset drive of simultaneously resetting the photoelectric conversion element of each of the plurality of pixels to start exposure of the plurality of pixels, a global shutter drive of simultaneously transferring, to the charge holder, charges accumulated in the photoelectric conversion element of each of the plurality of pixels by the exposure to end the exposure, and a first rolling readout drive of sequentially reading out, for each of the pixel rows, the signal corresponding to the charge held in the charge holder by the global shutter drive, the second drive being of a rolling shutter type and including a rolling reset drive of sequentially performing processing of discharging the charge of the photoelectric conversion element of the pixel row to the charge discharge region to start the exposure of the photoelectric conversion element, while changing the pixel rows, a rolling shutter drive of sequentially performing processing of transferring, to the charge holder, the charge accumulated in the photoelectric conversion element of the pixel row for which the exposure has been started by the rolling reset drive to end the exposure of the pixel row, while changing the pixel rows, and a second rolling readout drive of sequentially reading out the signal corresponding to the charge held in the charge holder of the pixel row by the rolling shutter drive, while changing the pixel rows; and a display control step of displaying, on a display device, a live view image generated based on the signal output from the pixel of the imager by the second drive, wherein a time required for the first rolling readout drive is longer than a time required for each of the rolling reset drive, the rolling shutter drive, and the second rolling readout drive, and wherein, in the imaging control step, in an imaging mode in which the first drive is performed while the second drive is continuously performed, a first start timing of the second drive performed first after a start of the first drive is set to be during an implementation period of the first rolling readout drive in the first drive, and a second start timing of the rolling shutter drive performed first after the start of the first drive is synchronized with a display update timing of the display device that comes first after an end of the first rolling readout drive.

In particular, the present invention is usefully and effectively applied to the digital camera, smart phone, or the like.

Although the present invention has been described with reference to the specific embodiment, the present invention is not limited to this embodiment, and various modifications are possible without departing from the technical concept of the described invention.

This application is on the basis of Japanese patent application (Japanese Patent Application No. 2017-063231) filed on Mar. 28, 2017, the content of which is incorporated herein.

EXPLANATION OF REFERENCES

100: digital camera
1: imaging lens
2: stop
4: lens control section
5: imager
60: imaging surface
61: pixel
61A: photoelectric conversion element
61B: charge holder
61C: charge transfer section
61D: floating diffusion
61E: readout circuit
61F: charge discharge region
RG: electrode for reset
62: pixel row
63: drive circuit
64: signal processing circuit
65: signal line
70: N-type substrate
71: P-well layer
72: readout electrode 73: N-type impurity layer
74: P-type impurity layer
75: region
76: transfer electrode
77: reset transistor
78: output transistor
79: selection transistor
8: lens drive section
9: stop drive section
10: imager drive section
11: system control section
11A: imaging controller
11B: display controller
11C: reliability determiner
11D: focus controller
11E: first reliability determiner
11F: first focus controller
11G: reliability threshold value controller
11H: second reliability determiner
11J: second focus controller
14: manipulation section
15: memory control section
16: main memory
17: digital signal processing section
20: external memory control section
21: storage medium
22: display device controller
23: display surface
23A: display pixel
23B: display pixel row
24: control bus
25: data bus
40: lens device
GS, GR, RS, RR, RO1, RO2, ST, DR: straight line
SS1: proper exposure time
SS2: maximum exposure time
200: smartphone
201: housing
202: display panel
203: manipulation panel
204: display input section
205: speaker
206: microphone
207: manipulation section
208: camera section
210: wireless Communication section
211: speech section
212: storage section
213: external input/output section
214: GPS receiver
215: motion sensor section
216: power supply section
217: internal storage section
218: external storage section
220: main control section
ST1 to STn: GPS satellite

What is claimed is:

1. An imaging apparatus comprising:
an imager
that has a plurality of pixels each including a photoelectric conversion element, a charge holder holding a charge transferred from the photoelectric conversion element such that a signal corresponding to the charge is read out by a readout circuit, and a charge discharge region to which the charge of the photoelectric conversion element is discharged without passing through the charge holder,
that comprises a plurality of pixel rows including the plurality of pixels arranged in one direction, and
that images a subject through an imaging optical system;
an imaging controller that performs a first drive and a second drive,
the first drive being of a global shutter type and including
a global reset drive of simultaneously resetting the photoelectric conversion element of each of the plurality of pixels to start exposure of the plurality of pixels,
a global shutter drive of simultaneously transferring, to the charge holder, charges accumulated in the photoelectric conversion element of each of the plurality of pixels by the exposure to end the exposure, and
a first rolling readout drive of sequentially reading out, for each of the pixel rows, the signal corresponding to the charge held in the charge holder by the global shutter drive,
the second drive being of a rolling shutter type and including
a rolling reset drive of sequentially performing, while changing the pixel rows, processing of discharging the charge of the photoelectric conversion element of the pixel row to the charge discharge region to start the exposure of the photoelectric conversion element,
a rolling shutter drive of sequentially performing, while changing the pixel rows, processing of transferring, to the charge holder, the charge accumulated in the photoelectric conversion element of the pixel row for which the exposure has been started by the rolling reset drive to end the exposure of the pixel row, and
a second rolling readout drive of sequentially reading out, while changing the pixel rows, the signal corresponding to the charge held in the charge holder of the pixel row by the rolling shutter drive; and
a display controller that displays, on a display device, a live view image generated based on the signal output from the pixel of the imager by the second drive,
wherein a time required for the first rolling readout drive is longer than a time required for each of the rolling reset drive, the rolling shutter drive, and the second rolling readout drive, and
wherein, in an imaging mode in which the imaging controller performs the first drive while continuously performing the second drive, the imaging controller sets a first start timing of the second drive performed first after a start of the first drive to be during an implementation period of the first rolling readout drive in the first drive, and synchronizes a second start timing of the rolling shutter drive performed first after the start of the first drive with a display update timing of the display device that comes first after an end of the first rolling readout drive.

2. The imaging apparatus according to claim 1,
wherein in a case where a maximum exposure time between an earliest timing that is capable of being set as the first start timing and the second start timing is less than a proper exposure time for obtaining a proper exposure value determined by a brightness of the subject imaged by the imager, the imaging controller sets the first start timing to be the earliest timing, and sets an imaging condition set at the first start timing to be a condition for obtaining the proper exposure value.

3. The imaging apparatus according to claim 2,
wherein the imaging mode is a mode in which processing of performing the second drive at least once after the start of the first drive is continuously performed a plurality of times, and
wherein the plurality of pixels of the imager includes phase difference detection pixels,
the imaging apparatus further comprising:
a reliability determiner that calculates a phase difference based on the signal output from the phase difference detection pixel by the second drive performed after the start of the first drive, and in a case where the maximum exposure time is less than the proper exposure time, determines a reliability of a calculation result of the phase difference; and
a focus controller that performs a focus control of a focus lens included in the imaging optical system based on the phase difference in a case where the reliability is equal to or more than a reliability threshold value.

4. The imaging apparatus according to claim 2,
wherein the imaging mode is a mode in which the second drive is continuously performed a plurality of times after the start of the first drive, and
wherein in a case where the maximum exposure time is less than the proper exposure time and a difference between the proper exposure time and the maximum exposure time is equal to or more than a predetermined time threshold value, the imaging controller sets an exposure time of the photoelectric conversion element in at least second and subsequent second drives of the plurality of times of second drives to be the proper exposure time.

5. The imaging apparatus according to claim 2,
wherein the imaging mode is a mode in which processing of performing the second drive a plurality of times after the start of the first drive is continuously performed a plurality of times, and
wherein the plurality of pixels of the imager includes phase difference detection pixels,
the imaging apparatus further comprising:
a first reliability determiner that calculates a first phase difference based on the signal output from the phase difference detection pixel by the second drive performed first after the start of the first drive, and in a case where the maximum exposure time is less than the proper exposure time, determines a first reliability of a calculation result of the first phase difference; and
a first focus controller that performs a focus control of a focus lens included in the imaging optical system based on the first phase difference in a case where the first reliability is equal to or more than a reliability threshold value, and performs a focus control of the focus lens based on a second phase difference calculated from the signal output from the phase difference detection pixel by at least the second and subsequent second drives of the plurality of times of second drives in a case where the first reliability is less than the reliability threshold value,
wherein in a case where the first reliability is less than the reliability threshold value, the imaging controller sets the exposure time of the photoelectric conversion element in at least the second and subsequent second drives to be the proper exposure time.

6. The imaging apparatus according to claim 5, further comprising:
a reliability threshold value controller that controls the reliability threshold value.

7. The imaging apparatus according to claim 6,
wherein the imaging mode includes a first mode in which a precision of the focus control is prioritized over an interval for implementing the first drive, and a second mode in which the interval for implementing the first drive is prioritized over the precision of the focus control, and
wherein in the first mode, the reliability threshold value controller controls the reliability threshold value to be a value higher than that of the second mode.

8. The imaging apparatus according to claim 6,
wherein in a case where the interval for implementing the first drive is equal to or more than a predetermined interval threshold value, the reliability threshold value controller controls the reliability threshold value to be a value greater than that in a case where the interval is less than the interval threshold value.

9. The imaging apparatus according to claim 1,
wherein the imaging mode is a mode in which processing of performing the second drive a plurality of times after the start of the first drive is continuously performed a plurality of times, and
wherein the plurality of pixels of the imager includes phase difference detection pixels,
the imaging apparatus further comprising:
a second focus controller that performs a focus control of a focus lens included in the imaging optical system, based on a signal output from the phase difference detection pixel by the first performed second drive; and
a second reliability determiner that determines, in a case where a maximum exposure time between an earliest timing that is capable of being set as the first start timing and the second start timing is less than a proper exposure time for obtaining a proper exposure value determined by a brightness of the subject imaged by the imager, a second reliability of the focus control in a case where the second drive is performed first under an imaging condition for obtaining the proper exposure value by the maximum exposure time, based on the maximum exposure time and the proper exposure value,
wherein in a case where the second reliability is less than a reliability threshold value, the imaging controller synchronizes the second start timing with a display update timing of the display device that comes for the second time after the end of the first rolling readout drive, and sets the first start timing to be a timing within the proper exposure time from the second start timing, and in a case where the second reliability is equal to or more than the reliability threshold value, the imaging controller synchronizes the second start timing with the display update timing of the display device that comes first after the end of the first rolling readout drive, and sets the first start timing to be a timing within the maximum exposure time from the second start timing.

10. The imaging apparatus according to claim 5, further comprising:
a second focus controller that performs a focus control of the focus lens included in the imaging optical system, based on a signal output from the phase difference detection pixel by the first performed second drive; and
a second reliability determiner that determines, in a case where a maximum exposure time between an earliest timing that is capable of being set as the first start timing and the second start timing is less than a proper exposure time for obtaining a proper exposure value determined by a brightness of the subject imaged by the imager, a second reliability of the focus control in a case where the second drive is performed first under an imaging condition for obtaining the proper exposure value by the maximum exposure time, based on the maximum exposure time and the proper exposure value, wherein in a case where the second reliability is less than a reliability threshold value, the imaging controller synchronizes the second start timing with a display update timing of the display device that comes for the second time after the end of the first rolling readout drive, and sets the first start timing to be a timing within the proper exposure time from the second start timing, and in a case where the second reliability is equal to or more than the reliability threshold value, the imaging controller synchronizes the second start timing with the display update timing of the display device that comes first after the end of the first rolling readout drive, and sets the first start timing to be a timing within the maximum exposure time from the second start timing, and wherein a first function unit and a second function unit are selectively operated, the first function unit including the imaging controller, the display controller, the first focus controller and the first reliability determiner, and the second function unit including the imaging controller, the display controller, the second focus controller and the second reliability determiner.

11. The imaging apparatus according to claim 10, wherein the first function unit is operated in a case where an interval for implementing the first drive is less than a predetermined interval threshold value, and wherein the second function unit is operated in a case where the interval is equal to or more than the interval threshold value.

12. The imaging apparatus according to claim 10, wherein the first function unit is operated in a case where a movement amount of the subject being imaged by the imager is equal to or more than a predetermined movement threshold value, and wherein the second function unit is operated in a case where the movement amount is less than the movement threshold value.

13. An imaging method using an imager that has a plurality of pixels each including a photoelectric conversion element, a charge holder holding a charge transferred from the photoelectric conversion element such that a signal corresponding to the charge is read out by a readout circuit, and a charge discharge region to which the charge of the photoelectric conversion element is discharged without passing through the charge holder, that comprises a plurality of pixel rows including the plurality of pixels arranged in one direction, and that images a subject through an imaging optical system, the imaging method comprising:

an imaging control step of performing a first drive and a second drive, the first drive being of a global shutter type and including a global reset drive of simultaneously resetting the photoelectric conversion element of each of the plurality of pixels to start exposure of the plurality of pixels, a global shutter drive of simultaneously transferring, to the charge holder, charges accumulated in the photoelectric conversion element of each of the plurality of pixels by the exposure to end the exposure, and a first rolling readout drive of sequentially reading out, for each of the pixel rows, the signal corresponding to the charge held in the charge holder by the global shutter drive, the second drive being of a rolling shutter type and including a rolling reset drive of sequentially performing, while changing the pixel rows, processing of discharging the charge of the photoelectric conversion element of the pixel row to the charge discharge region to start the exposure of the photoelectric conversion element, a rolling shutter drive of sequentially performing, while changing the pixel rows, processing of transferring, to the charge holder, the charge accumulated in the photoelectric conversion element of the pixel row for which the exposure has been started by the rolling reset drive to end the exposure of the pixel row, and a second rolling readout drive of sequentially reading out, while changing the pixel rows, the signal corresponding to the charge held in the charge holder of the pixel row by the rolling shutter drive; and a display control step of displaying, on a display device, a live view image generated based on the signal output from the pixel of the imager by the second drive, wherein a time required for the first rolling readout drive is longer than a time required for each of the rolling reset drive, the rolling shutter drive, and the second rolling readout drive, and wherein, in the imaging control step, in an imaging mode in which the first drive is performed while the second drive is continuously performed, a first start timing of the second drive performed first after a start of the first drive is set to be during an implementation period of the first rolling readout drive in the first drive, and a second start timing of the rolling shutter drive performed first after the start of the first drive is synchronized with a display update timing of the display device that comes first after an end of the first rolling readout drive.

14. The imaging method according to claim 13, wherein in the imaging control step, in a case where a maximum exposure time between an earliest timing that is capable of being set as the first start timing and the second start timing is less than a proper exposure time for obtaining a proper exposure value determined by a brightness of the subject imaged by the imager, the first start timing is set to be the earliest timing, and an imaging condition set at the first start timing is set to be a condition for obtaining the proper exposure value.

15. The imaging method according to claim 14, wherein the imaging mode is a mode in which processing of performing the second drive at least once after the start of the first drive is continuously performed a plurality of times, and wherein the plurality of pixels of the imager includes phase difference detection pixels, the imaging method, further comprising:

a reliability determination step of calculating a phase difference based on the signal output from the phase difference detection pixel by the second drive performed after the start of the first drive, and in a case where the maximum exposure time is less than the proper exposure time, determining a reliability of a calculation result of the phase difference; and a focus control step of performing a focus control of a focus lens included in the imaging optical system based on the phase difference in a case where the reliability is equal to or more than a reliability threshold value.

16. The imaging method according to claim 14,
wherein the imaging mode is a mode in which the second drive is continuously performed a plurality of times after the start of the first drive, and
wherein in the imaging control step, in a case where the maximum exposure time is less than the proper exposure time and a difference between the proper exposure time and the maximum exposure time is equal to or more than a predetermined time threshold value, an exposure time of the photoelectric conversion element in at least second and subsequent second drives of the plurality of times of second drives is set to be the proper exposure time.

17. The imaging method according to claim 14,
wherein the imaging mode is a mode in which processing of performing the second drive a plurality of times after the start of the first drive is continuously performed a plurality of times, and
wherein the plurality of pixels of the imager includes phase difference detection pixels,
the imaging method, further comprising:
a first reliability determination step of calculating a first phase difference based on the signal output from the phase difference detection pixel by the second drive performed first after the start of the first drive, and in a case where the maximum exposure time is less than the proper exposure time, determining a first reliability of a calculation result of the first phase difference; and
a first focus control step of performing a focus control of a focus lens included in the imaging optical system based on the first phase difference in a case where the first reliability is equal to or more than a reliability threshold value, and performing a focus control of the focus lens based on a second phase difference calculated from the signal output from the phase difference detection pixel by at least the second and subsequent second drives of the plurality of times of second drives in a case where the first reliability is less than the reliability threshold value,
wherein in the imaging control step, in a case where the first reliability is less than the reliability threshold value, the exposure time of the photoelectric conversion element in at least the second and subsequent second drives is set to be the proper exposure time.

18. The imaging method according to claim 17, further comprising:
a reliability threshold value control step of controlling the reliability threshold value.

19. The imaging method according to claim 18,
wherein the imaging mode includes a first mode in which a precision of the focus control is prioritized over an interval for implementing the first drive, and a second mode in which the interval for implementing the first drive is prioritized over the precision of the focus control, and
wherein in the reliability threshold value control step, in the first mode, the reliability threshold value is controlled to be a value higher than that of the second mode.

20. The imaging method according to claim 18,
wherein in the reliability threshold value control step, in a case where the interval for implementing the first drive is equal to or more than a predetermined interval threshold value, the reliability threshold value is controlled to be a value greater than that in a case where the interval is less than the interval threshold value.

21. The imaging method according to claim 13,
wherein the imaging mode is a mode in which processing of performing the second drive a plurality of times after the start of the first drive is continuously performed a plurality of times, and
wherein the plurality of pixels of the imager includes phase difference detection pixels,
the imaging method, further comprising:
a second focus control step of performing a focus control of a focus lens included in the imaging optical system, based on a signal output from the phase difference detection pixel by the first performed second drive; and
a second reliability determination step of determining, in a case where a maximum exposure time between an earliest timing that is capable of being set as the first start timing and the second start timing is less than a proper exposure time for obtaining a proper exposure value determined by a brightness of the subject imaged by the imager, a second reliability of the focus control in a case where the second drive is performed first under an imaging condition for obtaining the proper exposure value by the maximum exposure time, based on the maximum exposure time and the proper exposure value,
wherein in the imaging control step, in a case where the second reliability is less than a reliability threshold value, the second start timing is synchronized with a display update timing of the display device that comes for the second time after the end of the first rolling readout drive, and the first start timing is set to be a timing within the proper exposure time from the second start timing, and in a case where the second reliability is equal to or more than the reliability threshold value, the second start timing is synchronized with the display update timing of the display device that comes first after the end of the first rolling readout drive, and the first start timing is set to be a timing within the maximum exposure time from the second start timing.

22. The imaging method according to claim 17, further comprising:
a second focus control step of performing a focus control of the focus lens included in the imaging optical system, based on a signal output from the phase difference detection pixel by the first performed second drive; and
a second reliability determination step of determining, in a case where a maximum exposure time between an earliest timing that is capable of being set as the first start timing and the second start timing is less than a proper exposure time for obtaining a proper exposure value determined by a brightness of the subject imaged by the imager, a second reliability of the focus control in a case where the second drive is performed first under an imaging condition for obtaining the proper exposure value by the maximum exposure time, based on the maximum exposure time and the proper exposure value,
wherein in the imaging control step, in a case where the second reliability is less than a reliability threshold value, the second start timing is synchronized with a display update timing of the display device that comes for the second time after the end of the first rolling readout drive, and the first start timing is set to be a timing within the proper exposure time from the second start timing, and in a case where the second reliability is equal to or more than the reliability threshold value, the second start timing is synchronized with the display update timing of the display device that comes first after the end of the first rolling readout drive, and the first start timing is set to be a timing within the maximum exposure time from the second start timing, and wherein a first function and a second function are selectively enabled, the first function including the imaging control step, the display control step, the first focus control step and the first reliability determination step, and the second function including the imaging control step, the display control step, the second focus control step and the second reliability determination step.

23. The imaging method according to claim 22,
wherein the first function is enabled in a case where an interval for implementing the first drive is less than a predetermined interval threshold value, and
wherein the second function is enabled in a case where the interval is equal to or more than the interval threshold value.

24. The imaging method according to claim 22,
wherein the first function is enabled in a case where a movement amount of the subject being imaged by the imager is equal to or more than a predetermined movement threshold value, and
wherein the second function is enabled in a case where the movement amount is less than the movement threshold value.

25. A non-transitory computer readable medium storing an imaging program causing a computer to execute an imaging method using an imager
that has a plurality of pixels each including a photoelectric conversion element, a charge holder holding a charge transferred from the photoelectric conversion element such that a signal corresponding to the charge is read out by a readout circuit, and a charge discharge region to which the charge of the photoelectric conversion element is discharged without passing through the charge holder,
that comprises a plurality of pixel rows including the plurality of pixels arranged in one direction, and
that images a subject through an imaging optical system, the imaging method comprising:
an imaging control step of performing a first drive and a second drive,
the first drive being of a global shutter type and including
a global reset drive of simultaneously resetting the photoelectric conversion element of each of the plurality of pixels to start exposure of the plurality of pixels,
a global shutter drive of simultaneously transferring, to the charge holder, charges accumulated in the photoelectric conversion element of each of the plurality of pixels by the exposure to end the exposure, and
a first rolling readout drive of sequentially reading out, for each of the pixel rows, the signal corresponding to the charge held in the charge holder by the global shutter drive,
the second drive being of a rolling shutter type and including
a rolling reset drive of sequentially performing, while changing the pixel rows, processing of discharging the charge of the photoelectric conversion element of the pixel row to the charge discharge region to start the exposure of the photoelectric conversion element,
a rolling shutter drive of sequentially performing, while changing the pixel rows, processing of transferring, to the charge holder, the charge accumulated in the photoelectric conversion element of the pixel row for which the exposure has been started by the rolling reset drive to end the exposure of the pixel row, and
a second rolling readout drive of sequentially reading out, while changing the pixel rows, the signal corresponding to the charge held in the charge holder of the pixel row by the rolling shutter drive; and
a display control step of displaying, on a display device, a live view image generated based on the signal output from the pixel of the imager by the second drive,
wherein a time required for the first rolling readout drive is longer than a time required for each of the rolling reset drive, the rolling shutter drive, and the second rolling readout drive, and
wherein, in the imaging control step, in an imaging mode in which the first drive is performed while the second drive is continuously performed, a first start timing of the second drive performed first after a start of the first drive is set to be during an implementation period of the first rolling readout drive in the first drive, and a second start timing of the rolling shutter drive performed first after the start of the first drive is synchronized with a display update timing of the display device that comes first after an end of the first rolling readout drive.

* * * * *